United States Patent [19]
Mukai et al.

[11] Patent Number: 5,086,353
[45] Date of Patent: Feb. 4, 1992

[54] VARIABLE MAGNIFICATION VIEWFINDER OPTICAL SYSTEM

[75] Inventors: Hiromu Mukai; Kagumi Kojiya; Kohtaro Hayashi, all of Osaka, Japan; Taro Shibuya, Monrovia, Liberia

[73] Assignee: Minolta Camera Kabushiki Kaisha, Osaka, Japan

[21] Appl. No.: 616,698

[22] Filed: Nov. 20, 1990

Related U.S. Application Data

[63] Continuation of Ser. No. 333,701, Apr. 4, 1989, abandoned.

[30] Foreign Application Priority Data

Apr. 7, 1988 [JP] Japan ................... 63-86958

[51] Int. Cl.⁵ .............. G02B 25/00; G02B 23/14; G02B 15/15; G03B 13/02
[52] U.S. Cl. .................. 359/432; 359/422; 359/676; 359/643
[58] Field of Search ............ 350/570, 560, 423, 410; 354/155, 219, 222

[56] References Cited

U.S. PATENT DOCUMENTS

| | | | |
|---|---|---|---|
| 2,353,565 | 7/1944 | Kaprelian | 350/423 |
| 3,227,042 | 1/1966 | Smejkal et al. | 350/423 |
| 3,438,689 | 4/1969 | Wehr | 350/560 |
| 3,788,731 | 1/1974 | Sugiuva et al. | 350/423 |
| 4,249,793 | 2/1981 | Uehava | 350/560 |
| 4,779,969 | 10/1988 | Sato et al. | |
| 4,842,395 | 6/1989 | Sato et al. | 350/570 |

FOREIGN PATENT DOCUMENTS

| | | |
|---|---|---|
| 61-156018 | 7/1986 | Japan . |
| 61-156019 | 7/1986 | Japan . |
| 61-160712 | 7/1986 | Japan . |
| 61-160713 | 7/1986 | Japan . |

OTHER PUBLICATIONS

Fundamentals of Optics, International Student Edition, McGra-Hill Kogakusha, Ltd. (1976).
The Focal Encyclopedia of Photography, Focal Press, London and New York (8/1957).

Primary Examiner—Jon W. Henry
Attorney, Agent, or Firm—Price, Gess & Ubell

[57] ABSTRACT

The present invention provides a variable magnification viewfinder optical system, comprising from the object side: objective lens group of a positive refractive power, including a first lens unit of a negative refractive power and a second lens unit of a positive refractive power, said first and second lens units being shiftable along the optical axis of the optical system for changing the magnification of the optical system; condenser lens group of a positive refractive power; and eyepiece lens group of a negative refractive power; wherein the objective lens group forms a real image of an object and the real image can be observed through the eyepiece lens group; and wherein the optical system fulfills the following conditions;

$$-0.09/\text{mm} < 1/f_1 < -0.03/\text{mm}$$

$$0.04/\text{mm} < 1/f_2 < 0.11/\text{mm}$$

$$-0.1/\text{mm} < f_e/(f_1 \cdot f_2) < -0.035/\text{mm}$$

wherein: $f_1$ represents focal length of the first lens unit of the objective lens group in millimeters; $f_2$ represents focal length of the second lens unit of the objective lens group in millimeters; and $f_e$ represents focal length of the eyepiece lens group in millimeters.

18 Claims, 33 Drawing Sheets

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Spherical Aberration

Astigmatism

Astigmatism

Distortion

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Spherical Aberration

Astigmatism

Astigmatism

Distortion

Distortion

Spherical Aberration

Astigmatism

Distortion

Spherical Aberration

Astigmatism

Distortion

Spherical Aberration

Spherical Aberration

Astigmatism

Astigmatism

Distortion

Distortion

Spherical Aberration

Astigmatism

Distortion

Spherical Aberration

Spherical Aberration

Astigmatism

Astigmatism

Distortion

Distortion

VARIABLE MAGNIFICATION VIEWFINDER OPTICAL SYSTEM

This is a continuation of application Ser. No. 333,701, filed Apr. 4, 1989 now abandoned.

BACKGROUND OF THE INVENTION

1. Field of the Invention

The present invention relates to a viewfinder optical system used in a photographic camera or in a video camera.

2. Description of the Prior Art

A camera of a type having a viewfinder optical system independently of a photographic optical system has been known. In this type of camera, the viewfinder optical system must alter its magnification if a zoom lens system is used as the photographic optical system. Therefore, a plurality of kinds of variable magnification viewfinder optical systems have been proposed.

Japanese Laid-Open Patent Application No. 61-160712 proposes a variable magnification viewfinder optical system of inverted Galilean type. The variable magnification viewfinder optical system, proposed by Japanese Laid-Open Patent Application No. 61-160712, comprises from the object side, an objective lens group of a negative refractive power including a positive front lens unit and a negative rear lens unit, and an eyepiece lens group of a positive refractive power, wherein the positive front lens unit and the negative rear lens unit are independently shiftable along the optical axis of the optical system for continuously altering magnification thereof while the eyepiece lens group is stationary on the optical axis. Additionally, Japanese Laid-Open Patent Application No. 61-160712 also proposes, in its embodiments, a combination of an inverted Galilean type finder lens system and an Albada finder system. Therefore, a virtual image of a photographic frame is formed by the Albada finger system together with a virtual finder image formed by the inverted Galilean type finder lens system. Namely, in some embodiments disclosed in Japanese Laid-Open Patent application No. 61-160712, a half-mirror layer is provided on a rear surface of the negative rear lens unit of the objective lens group for reflecting light coming from a photographic frame located behind the objective lens group.

However, the above-explained type finder optical system, which forms the virtual finder image together with the virtual image of the photographic frame, has drawbacks in which a finder field covered by the virtual image of the photographic frame may be changed in accordance with the change in position of the observer's eye, and in that the virtual image of the photographic frame may be blurred in altering the finder magnification. It should be also necessary to design the optical system so as to prevent the occurrence of any ghost and flare due to the half-mirror. Additionally, the diameter of the objective lens group may have to become large for obtaining more change in the finder magnification.

On the other hand, the other type viewfinder optical system has also been known in which a real image of an object is formed by an objective lens group of a positive refractive power and a photographic frame is located at the position on which the real image of the object is formed by the objective lens group, and in which the real image and the photographic frame are observed through an eyepiece lens group located at the rear side of the photographic frame. In this type of viewfinder optical system, the photographic frame can be observed clearly and a correct finder field can be indicated by the photographic frame even if the position of the observer's eye is changed.

Japanese Laid-Open Patent Application No. 61-156018 proposes a variable magnification viewfinder optical system comprising, from the object side, an objective lens group of a positive refractive power including a first negative lens unit, a second positive lens unit and a third positive lens unit, and an eyepiece lens group of a positive refractive power, wherein a real image of an object is formed nearby the third lens unit by the first and second lens units, and wherein the first and second lens units are shiftable for continuously altering the finder magnification.

However, the variable magnification viewfinder optical system proposed by Japanese Laid-Open Patent Application No. 61-156018 has an insufficient change of the finder magnification. Additionally, the variable magnification viewfinder optical system proposed by Japanese Laid-Open Patent Application No. 61-156018 is severe on errors caused in manufacturing each of the lens elements contained in each lens groups and in assembling them to complete an optical system since the respective lens groups are designed to have relatively strong refractive powers, although the total length of the whole optical system is compact.

SUMMARY OF THE INVENTION

An object of the present invention is to provide a variable magnification viewfinder optical system in which a real image of an object is once formed therein, and having a sufficient change in finder magnification.

Another object of the present invention is to provide a variable magnification viewfinder optical system having a high ratio of changing the finder magnification.

A further other object of the present invention is to provide the above-noted variable magnification viewfinder optical system in which an image of the photographic frame can be clearly observed, and in which a correct finder field can be indicated by the photographic frame even is the position of the observer's eye is changed.

Another object of the present invention is to provide a variable magnification viewfinder optical system having a high ratio of changing the finder magnification reaching about 2.0 and a minimum finder magnification of 0.4.

The achieve the above objects, according to the present invention, a variable magnification viewfinder optical system, comprises from the object side: an objective lens group of a positive refractive power, including a first lens unit of a negative refractive power and a second lens unit of a positive refractive power, said first and second lens units being shiftable along the optical axis of the optical system for changing the magnification of the optical system; a condenser lens group of a positive refractive power; and an eyepiece lens group of a negative refractive power; wherein the objective lens group forms an actual image of an object and the actual image can be observed through the eyepiece lens group; and wherein the optical system fulfills the following conditions;

$$0.09/\text{mm} < 1/f_1 < -0.03/\text{mm}$$

$$0.04/\text{mm} < 1/f_2 < 0.11/\text{mm}$$

$-0.1/\text{mm} < f_e/(f_1 \cdot f_2) < -0.035\text{mm}$ wherein:

$f_1$ represents a focal length of the first lens unit of the objective lens group in millimiters;

$f_2$ represents focal a length of the second lens unit of the objective lens group in millimeters; and $f_e$ represents a focal length of the eyepiece lens group in millimeters.

DETAILED DESCRIPTION OF THE PREFERRED EMBODIMENTS

Figure 1:
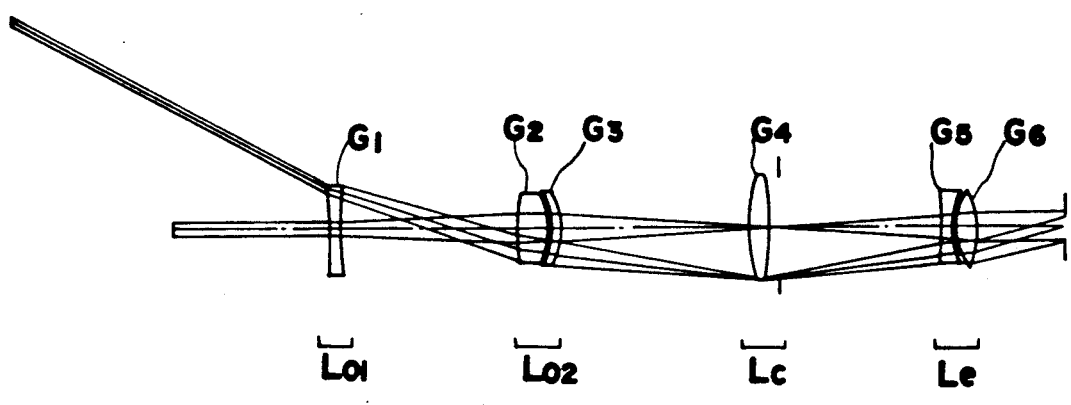
FIG. 1 represents a cross sectional view of a first embodiment according to the present invention in minimum magnification condition.
Figure 2:
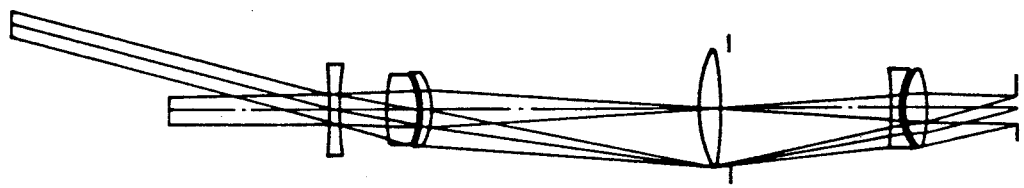
FIG. 2 represents a cross sectional view of the first embodiment according to the present invention in middle magnification condition.
Figure 3:
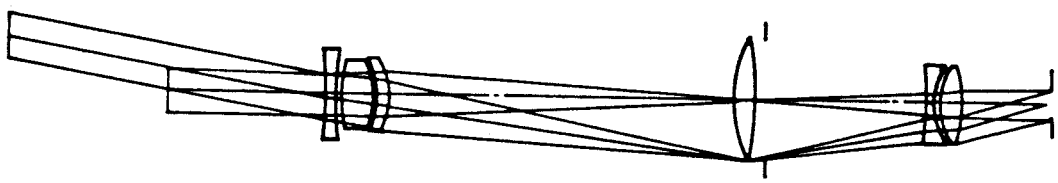
FIG. 3 represents a cross sectional view of the first embodiment according to the present invention in maximum magnification condition.
Figure 4:
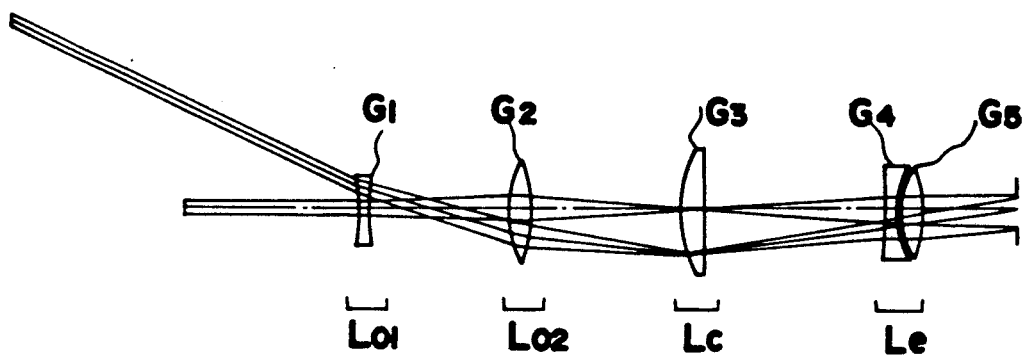
FIG. 4 represents a cross sectional view of a second embodiment according to the present invention in minimum magnification condition.
Figure 5:
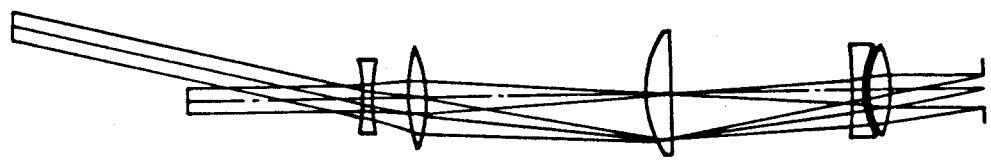
FIG. 5 represents a cross sectional view of the second embodiment according to the present invention in middle magnification condition.
Figure 6:
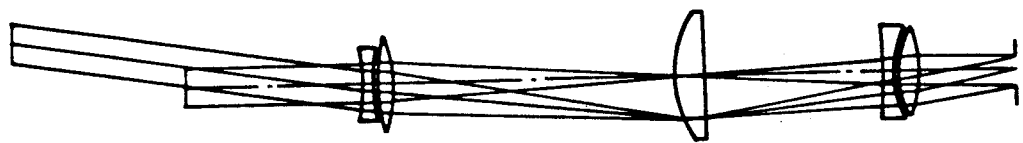
FIG. 6 represents a cross sectional view of the second embodiment according to the present invention in maximum magnification condition.
Figure 7:
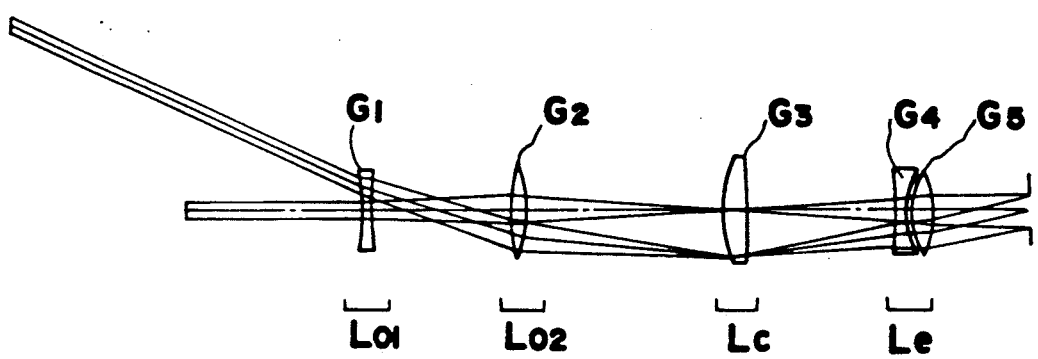
FIG. 7 represents a cross sectional view of a third embodiment according to the present invention in minimum magnification condition.
Figure 8:
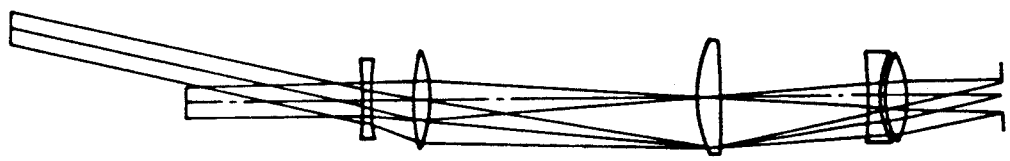
FIG. 8 represents a cross sectional view of the third embodiment according to the present invention in middle magnification condition.
Figure 9:
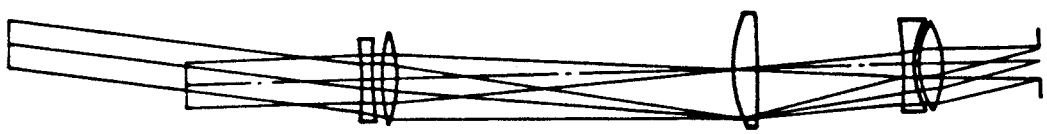
FIG. 9 represents a cross sectional view of the third embodiment according to the present invention in maximum magnification condition.
Figure 10:
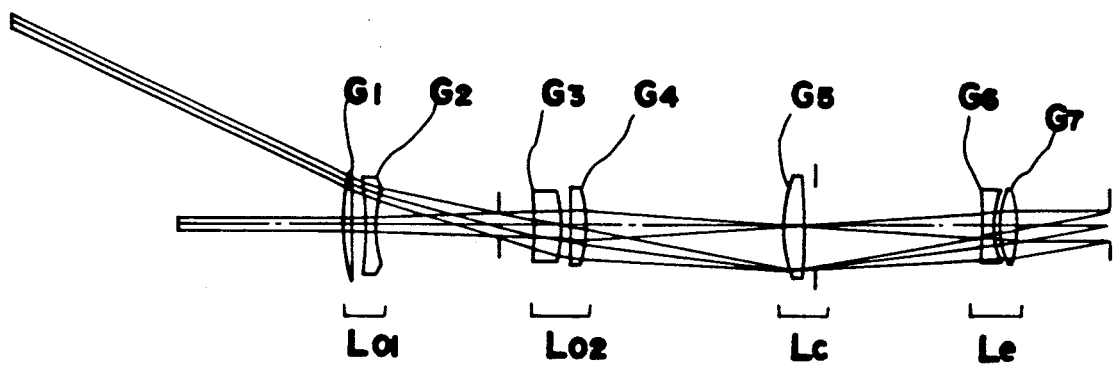
FIG. 10 represents a cross sectional view of a fourth embodiment according to the present invention in minimum magnification condition.
Figure 11:
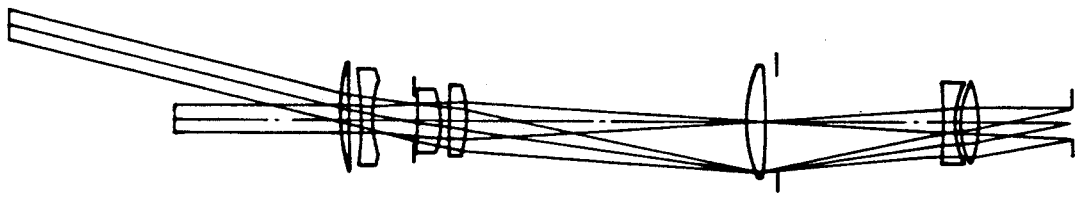
FIG. 11 represents a cross sectional view of the fourth embodiment according to the present invention in middle magnification condition.
Figure 12:
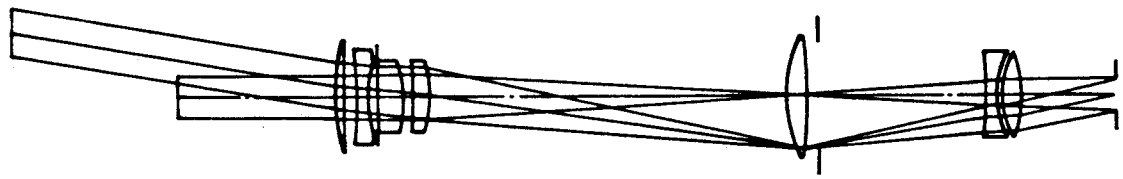
FIG. 12 represents a cross sectional view of the fourth embodiment according to the present invention in maximum magnification condition.
Figure 13:
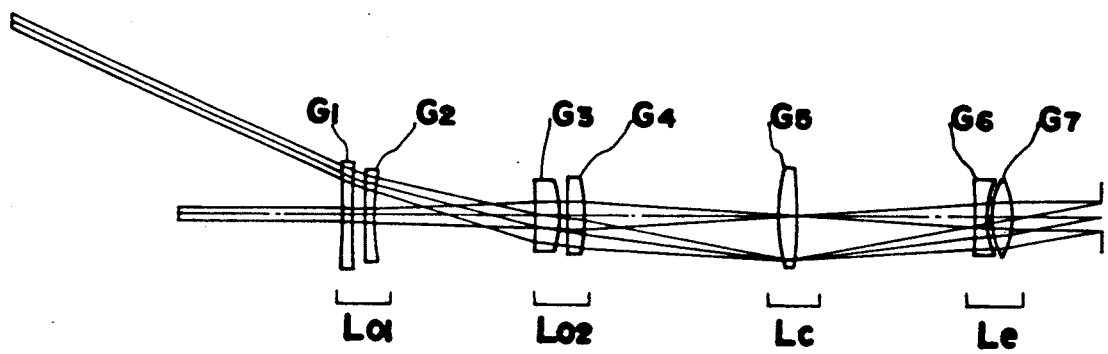
FIG. 13 represents a cross sectional view of a fifth embodiment according to the present invention in minimum magnification condition.
Figure 14:
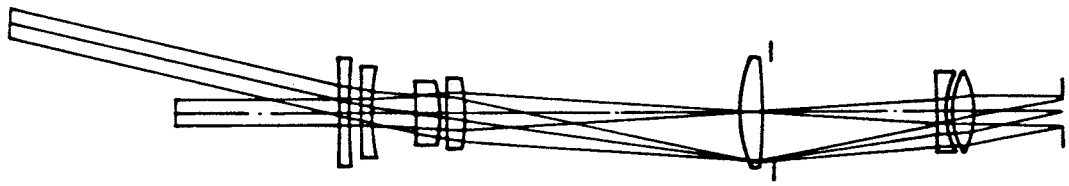
FIG. 14 represents a cross sectional view of the fifth embodiment according to the present invention in middle magnification condition.
Figure 15:
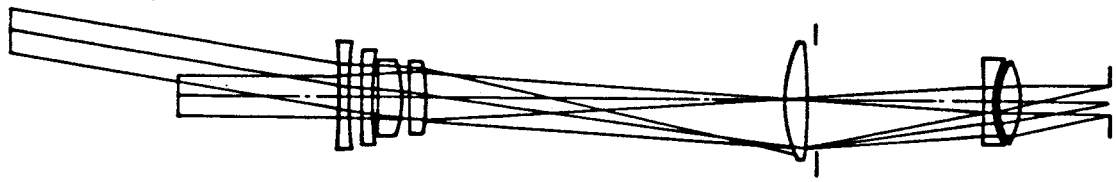
FIG. 15 represents a cross sectional view of the fifth embodiment according to the present invention in maximum magnification condition.
Figure 16:
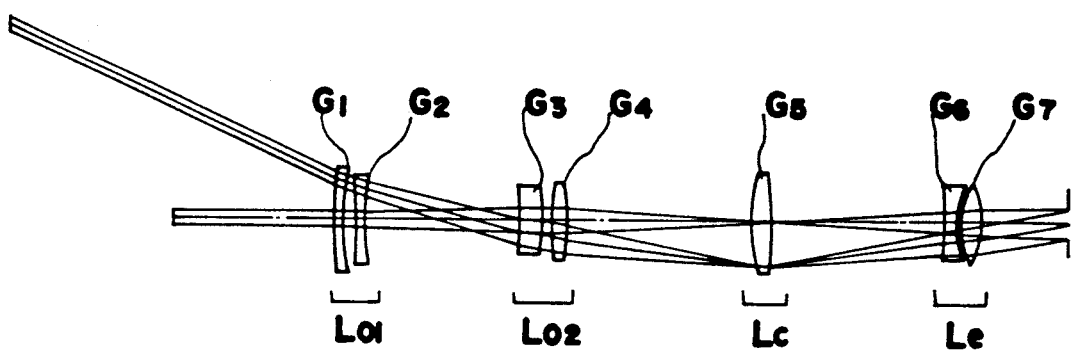
FIG. 16 represents a cross sectional view of a sixth embodiment according to the present invention in minimum magnification condition.
Figure 17:
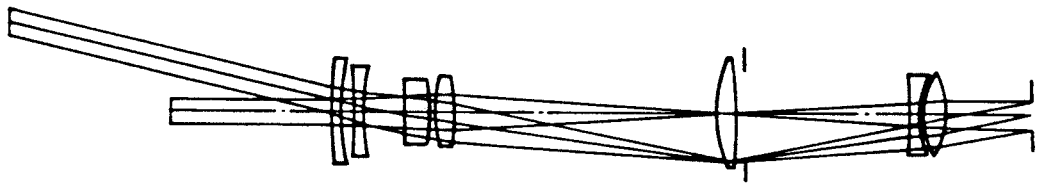
FIG. 17 represents a cross sectional view of the sixth embodiment according to the present invention in middle magnification condition.
Figure 18:
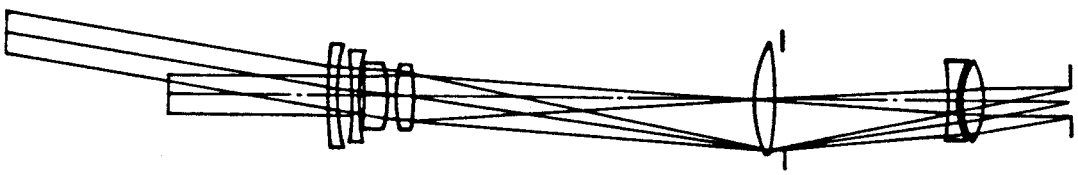
FIG. 18 represents a cross sectional view of the sixth embodiment according to the present invention in maximum magnification condition.
Figure 19:
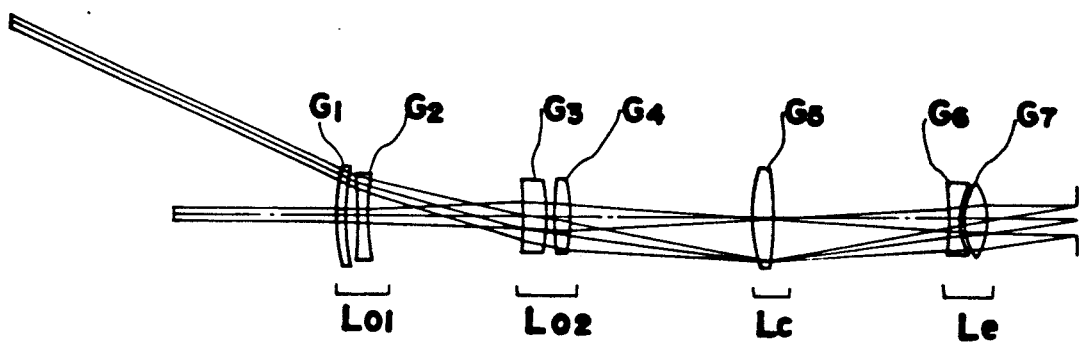
FIG. 19 represents a cross sectional view of a seventh embodiment according to the present invention in minimum magnification condition.
Figure 20:
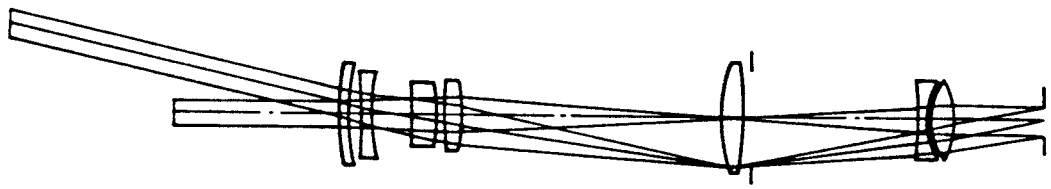
FIG. 20 represents a cross sectional view of the seventh embodiment according to the present invention in middle magnification condition.
Figure 21:
FIG. 21 represents a cross sectional view of the seventh embodiment according to the present invention in maximum magnification condition.
Figure 22:
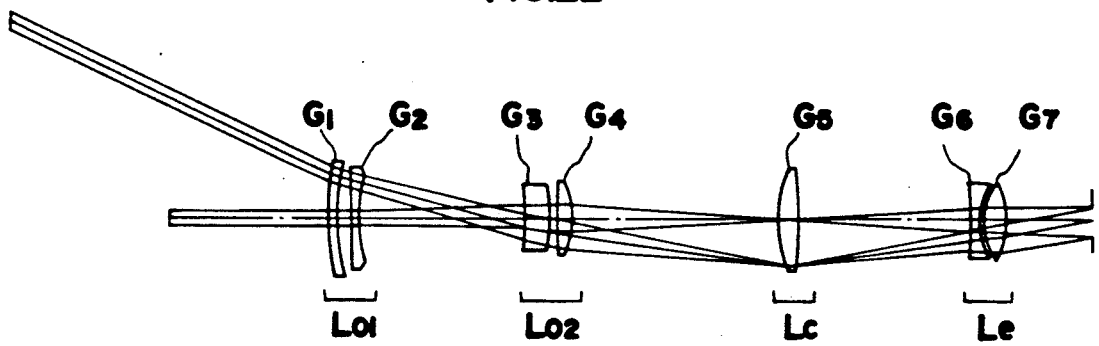
FIG. 22 represents a cross sectional view of a eighth embodiment according to the present invention in minimum magnification condition.
Figure 23:
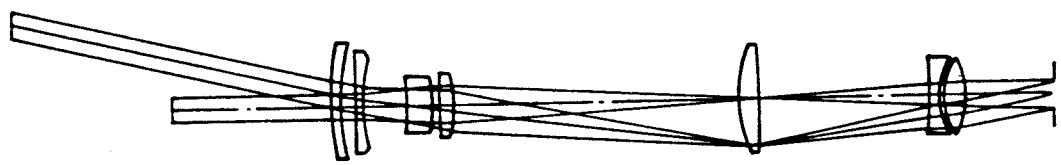
FIG. 23 represents a cross sectional view of the eighth embodiment according to the present invention in middle magnification condition.
Figure 24:
FIG. 24 represents a cross sectional view of the eighth embodiment according to the present invention in maximum magnification condition.
Figure 25:
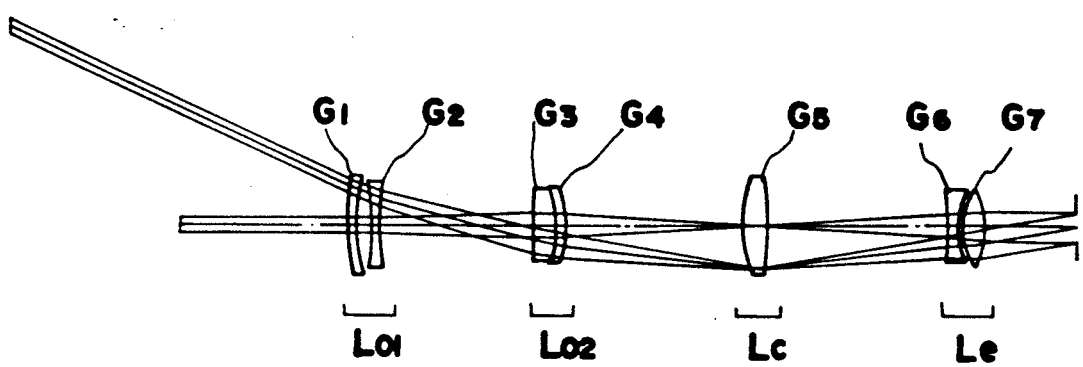
FIG. 25 represents a cross sectional view of a ninth embodiment according to the present invention in minimum magnification condition.
Figure 26:
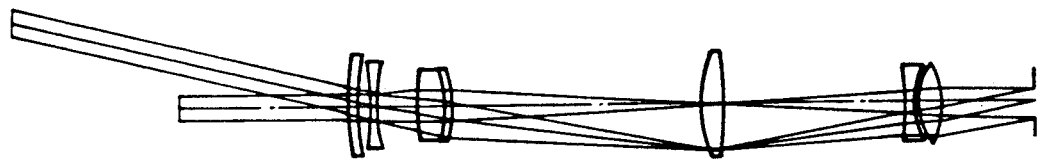
FIG. 26 represents a cross sectional view of the ninth embodiment according to the present invention in middle magnification condition.
Figure 27:
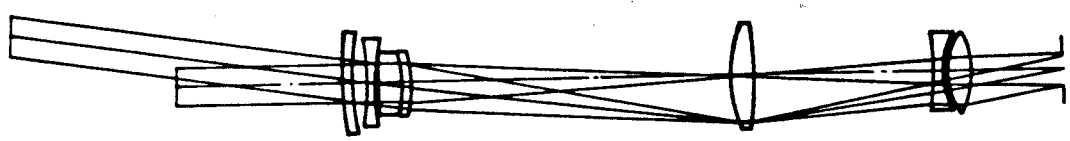
FIG. 27 represents a cross sectional view of the ninth embodiment according to the present invention in maximum magnification condition.
Figure 28:
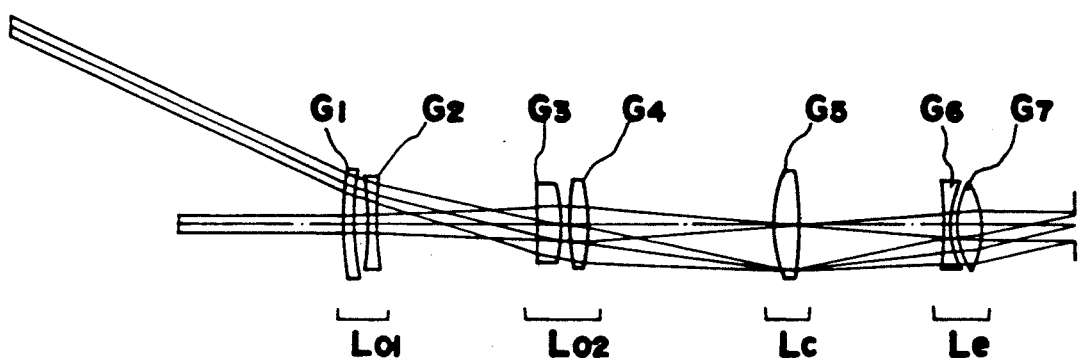
FIG. 28 represents a cross sectional view of a tenth embodiment according to the present invention in minimum magnification condition.
Figure 29:
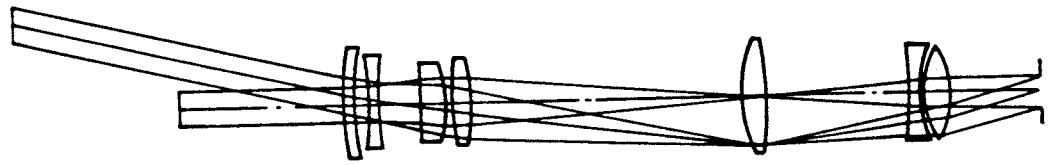
FIG. 29 represents a cross sectional view of the tenth embodiment according to the present invention in middle magnification condition.
Figure 30:
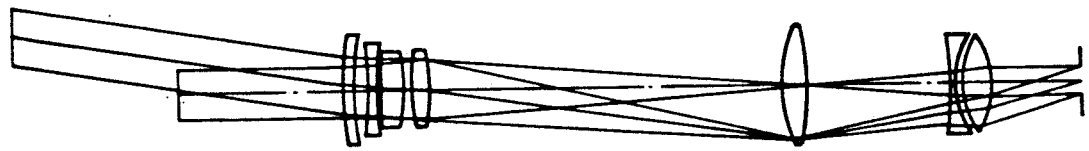
FIG. 30 represents a cross sectional view of the tenth embodiment according to the present invention in maximum magnification condition.
Figure 31A:
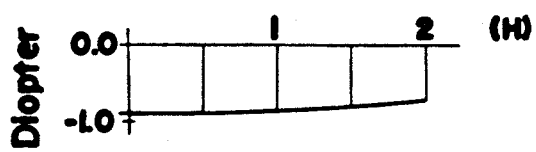
FIGS. 31a to 31c represent the aberration curves of the first embodiment in minimum magnification condition.
Figure 31B:
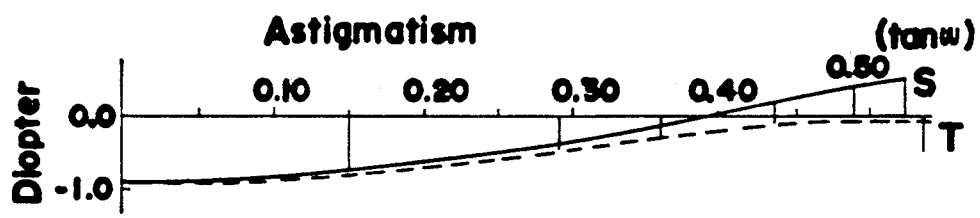
Figure 31C:
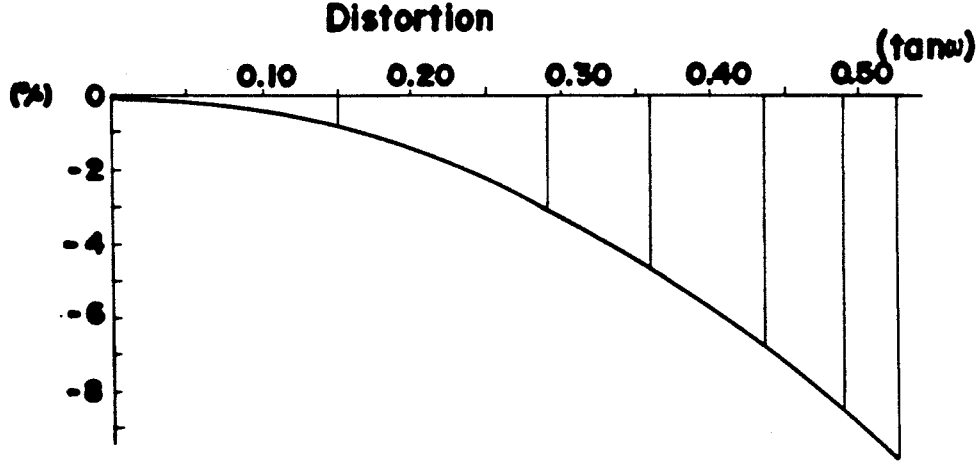
Figure 32A:
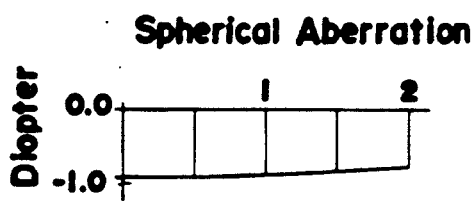
FIGS. 32a to 32c represent the aberration curves of the first embodiment in middle magnification condition.
Figure 32B:
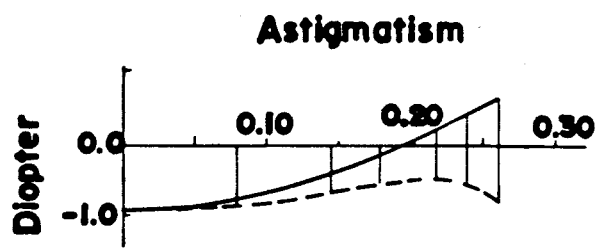
Figure 32C:
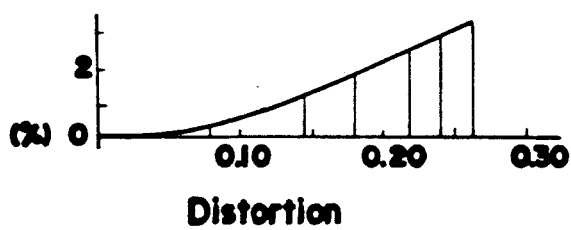
Figure 33A:
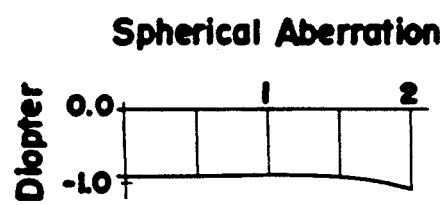
FIGS. 33a to 33c represent the aberration curves of the first embodiment in maximum magnification condition.
Figure 33B:
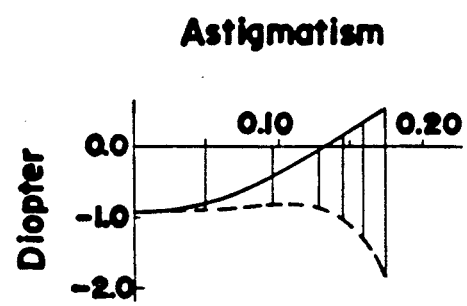
Figure 33C:
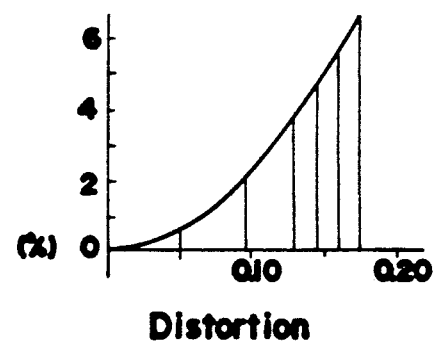
Figure 34A:
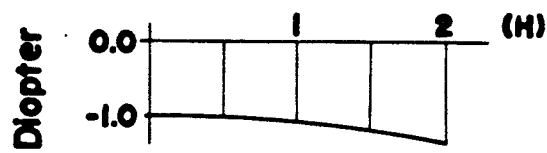
FIGS. 34a to 34c represent the aberration curves of the second embodiment in minimum magnification condition.
Figure 34B:
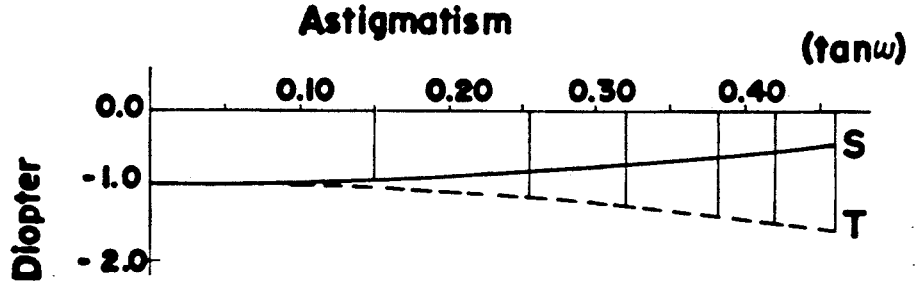
Figure 34C:
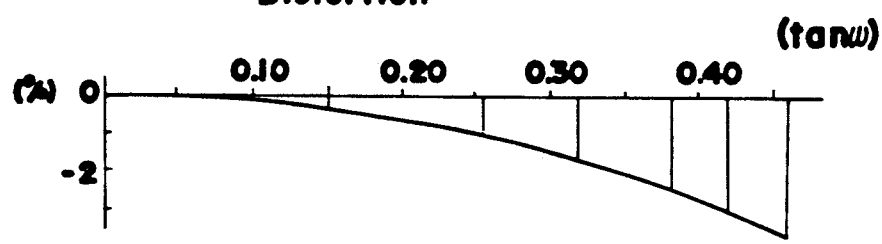
Figure 35A:
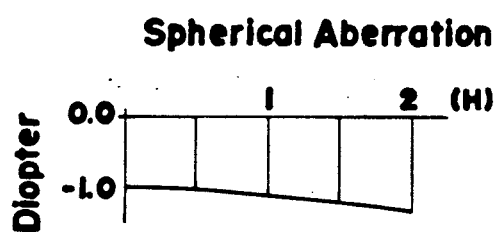
FIGS. 35a to 35c represent the aberration curves of the second embodiment in middle magnification condition.
Figure 35B:
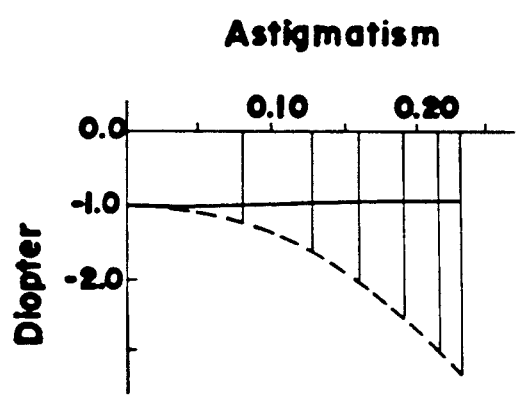
Figure 35C:
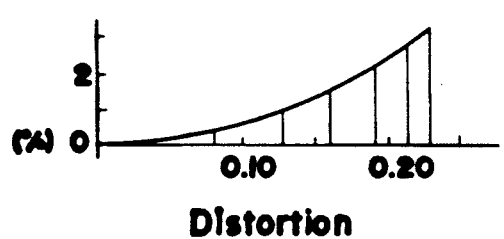
Figure 36A:
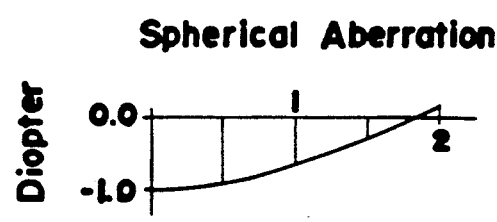
FIGS. 36a to 36c represent the aberration curves of the second embodiment in maximum magnification condition.
Figure 36B:
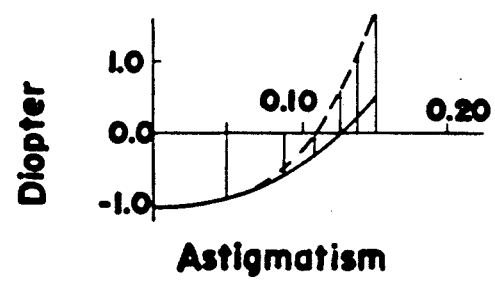
Figure 36C:
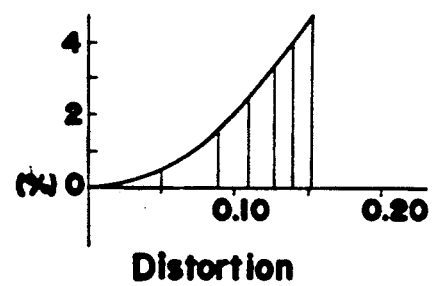
Figure 37A:
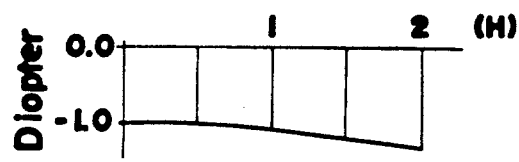
FIGS. 37a to 37c represent the aberration curves of the third embodiment in minimum magnification condition.
Figure 37B:
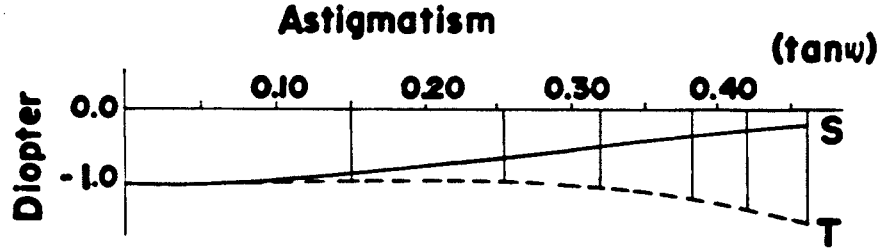
Figure 37C:
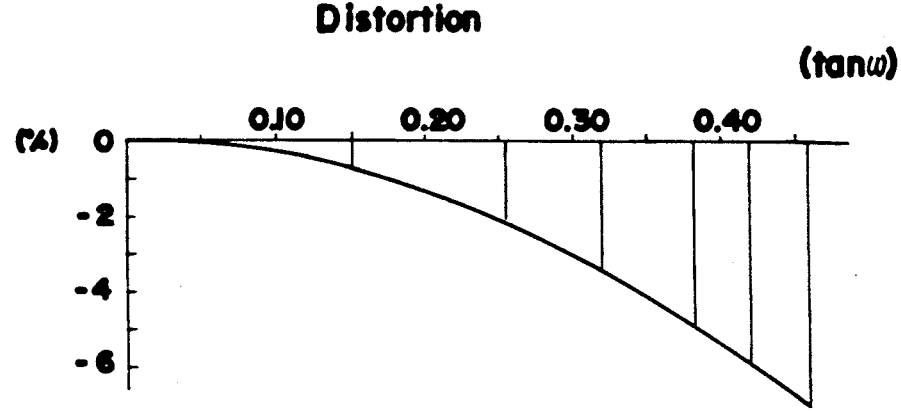
Figure 38A:
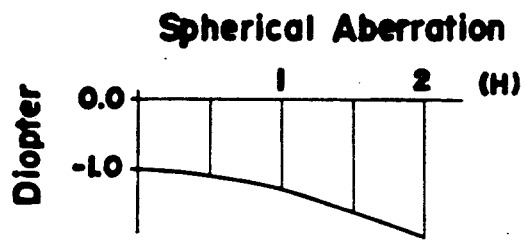
FIGS. 38a to 38c represent the aberration curves of the third embodiment in middle magnification condition.
Figure 39A:
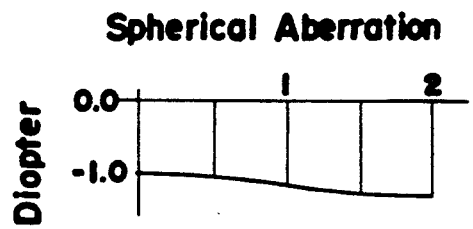
FIGS. 39a to 39c represent the aberration curves of the third embodiment in maximum magnification condition.
Figure 38B:
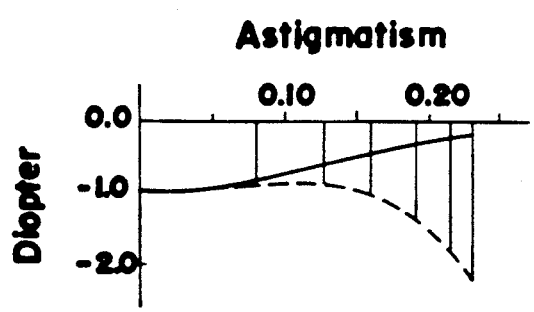
Figure 39B:
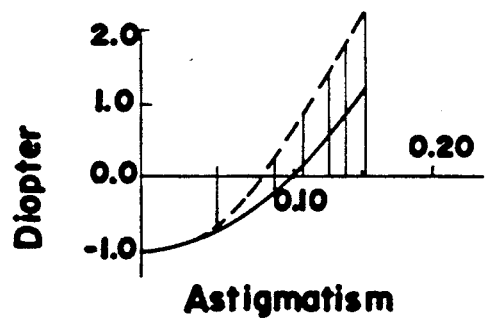
Figure 38C:
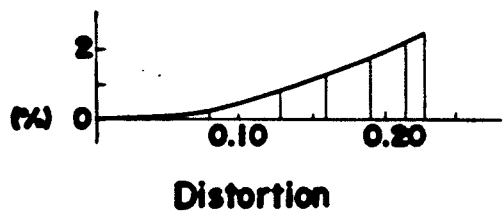
Figure 39C:
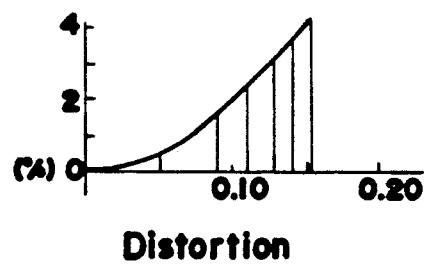
Figure 40A:
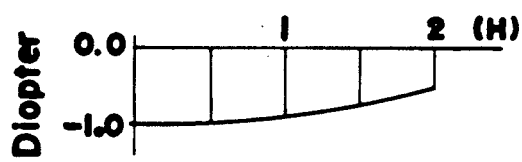
FIGS. 40a to 40c represent the aberration curves of the fourth embodiment in minimum magnification condition.
Figure 40B:
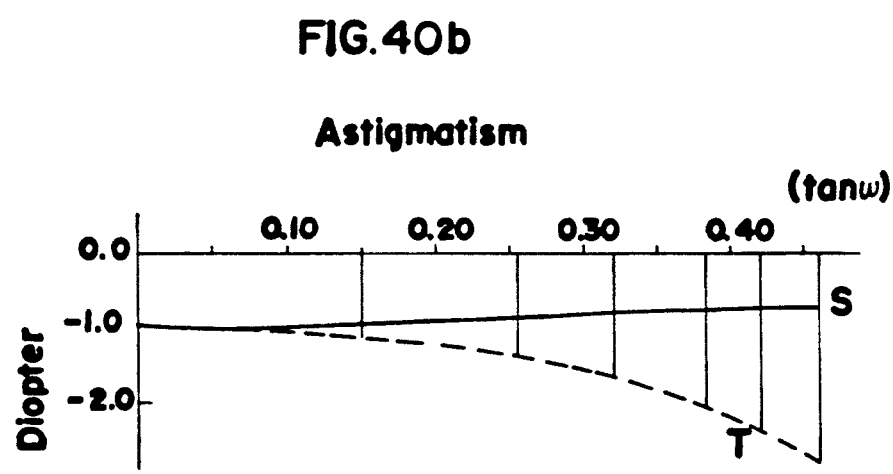
Figure 40C:
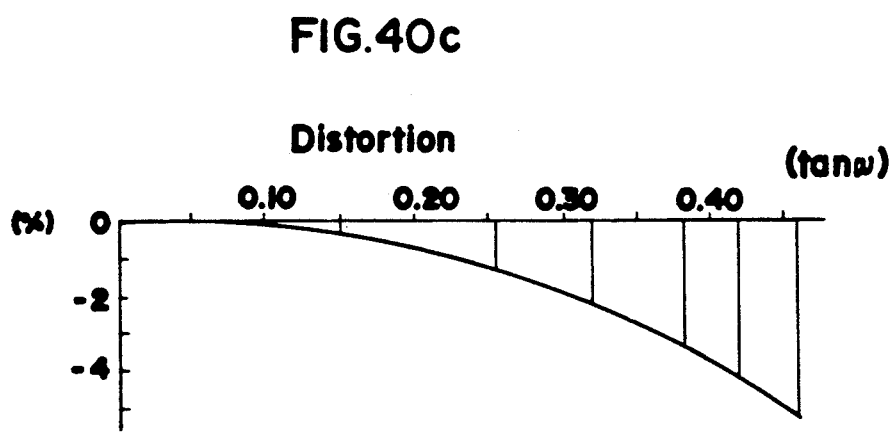
Figure 41A:
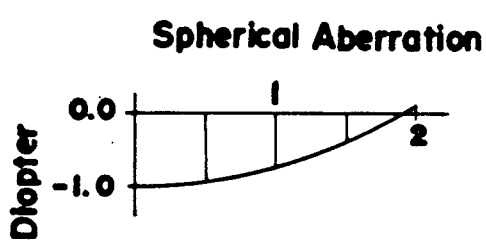
FIGS. 41a to 41c represent the aberration curves of the fourth embodiment in middle magnification condition.
Figure 42A:
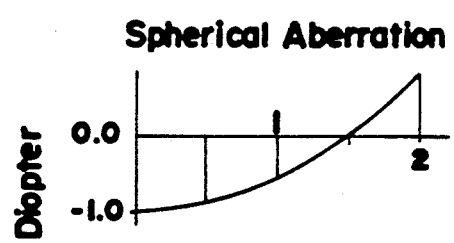
FIGS. 42a to 42c represent the aberration curves of the fourth embodiment in maximum magnification condition.
Figure 41B:
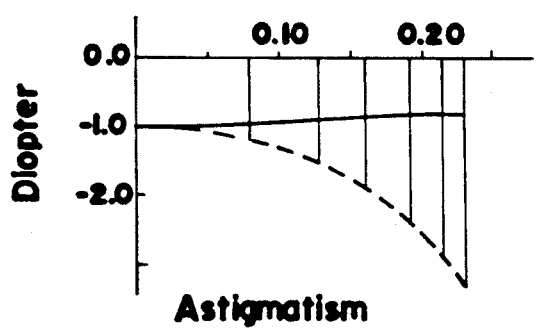
Figure 42B:
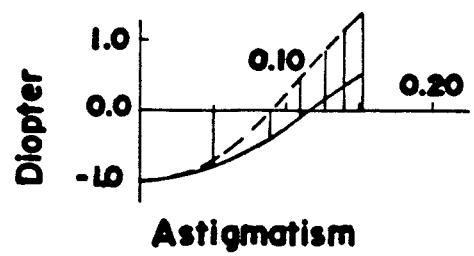
Figure 41C:
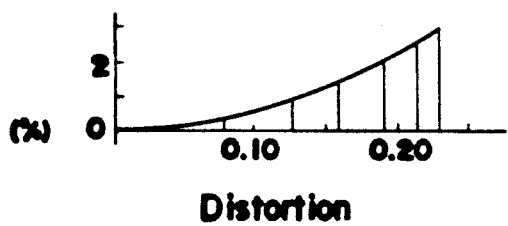
Figure 42C:
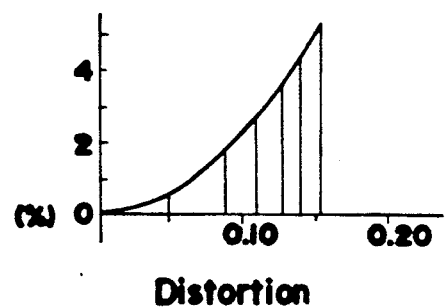
Figure 43A:
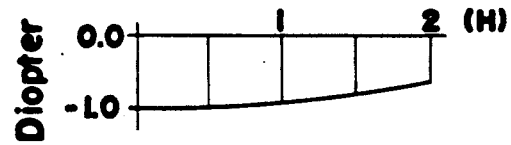
FIGS. 43a to 43c represent the aberration curves of the fifth embodiment in minimum magnification condition.
Figure 43B:
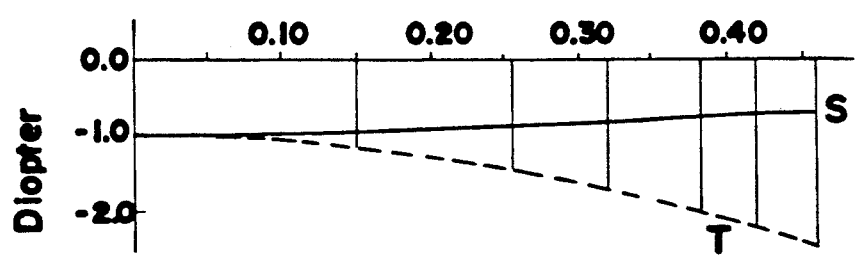
Figure 43C:
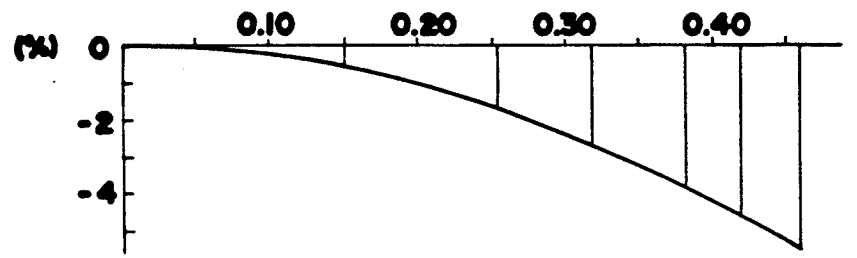
Figure 44A:
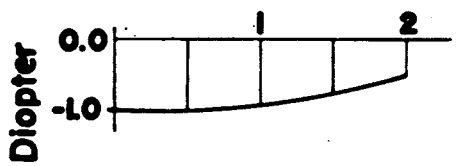
FIGS. 44a to 44c represent the aberration curves of the fifth embodiment in middle magnification condition.
Figure 44B:
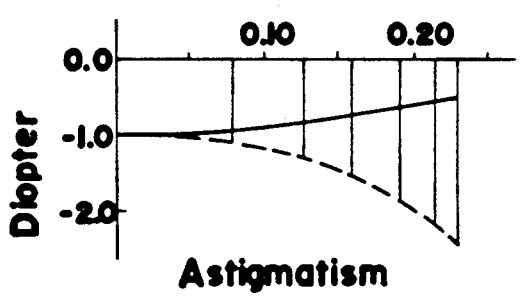
Figure 44C:
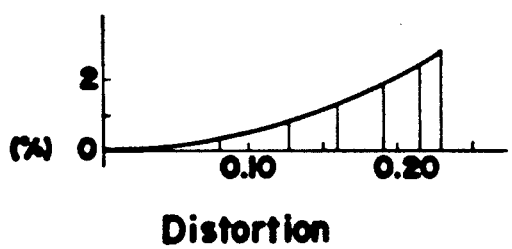
Figure 45A:
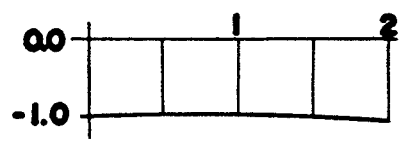
FIGS. 45a to 45c represent the aberration curves of the fifth embodiment in maximum magnification condition.
Figure 45B:
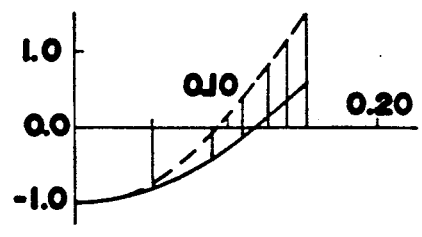
Figure 45C:
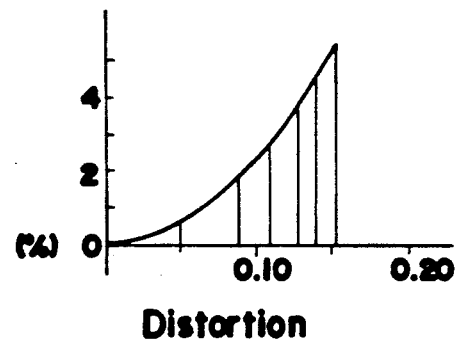
Figure 46A:
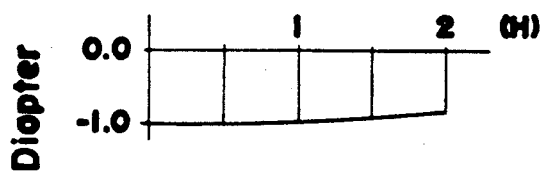
FIGS. 46a to 46c represent the aberration curves of the sixth embodiment in minimum magnification condition.
Figure 46B:
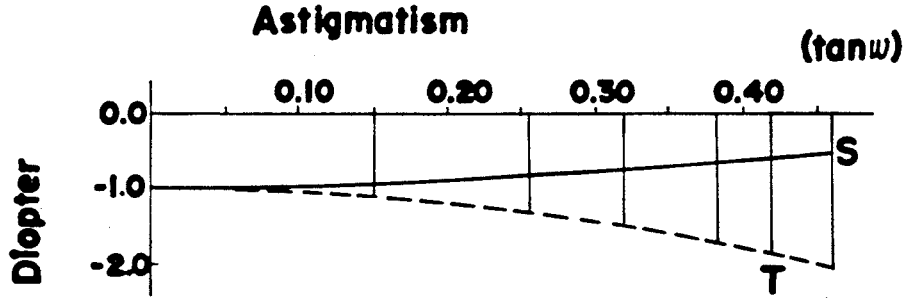
Figure 46C:
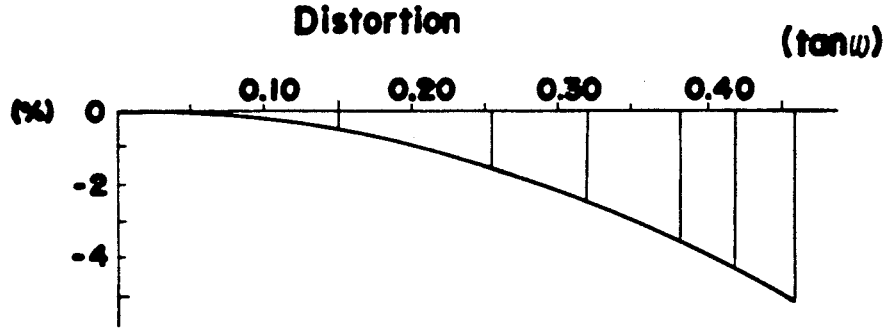
Figure 47A:
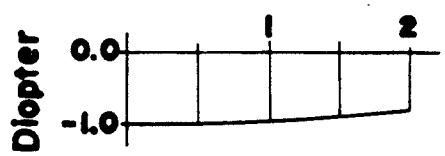
FIGS. 47a to 47c represent the aberration curves of the sixth embodiment in middle magnification condition.
Figure 48A:
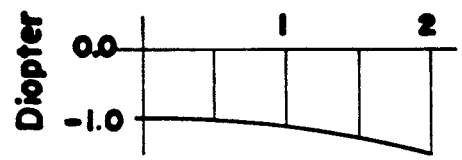
FIGS. 48a to 48c represent the aberration curves of the sixth embodiment in maximum magnification condition.
Figure 47B:
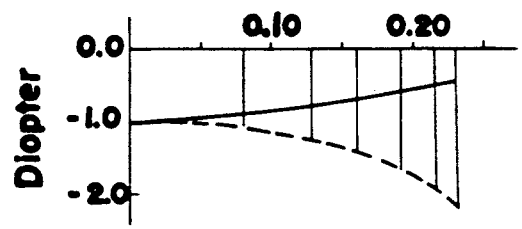
Figure 48B:
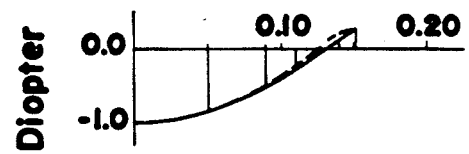
Figure 47C:
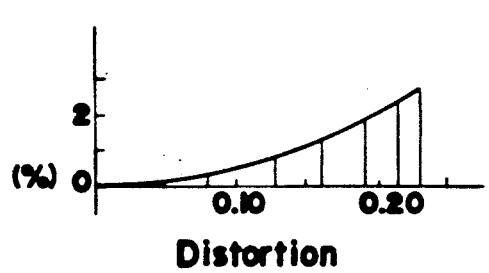
Figure 48C:
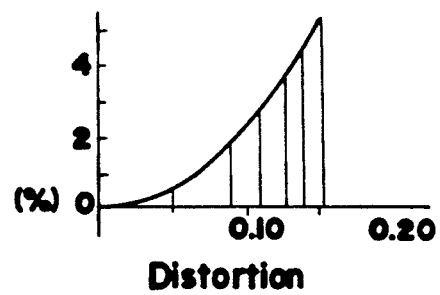
Figure 49A:
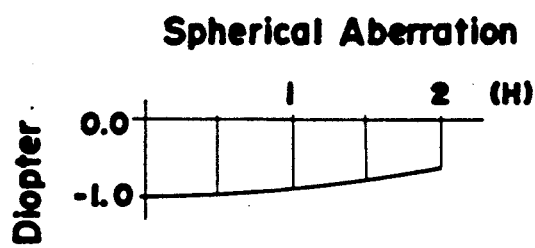
FIGS. 49a to 49c represent the aberration curves of the seventh embodiment in minimum magnification condition.
Figure 49B:
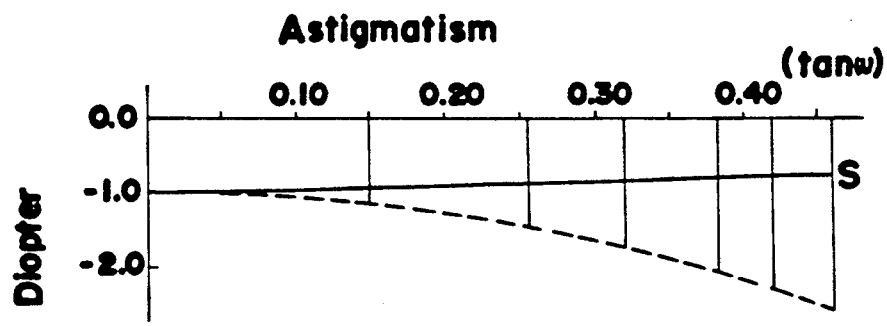
Figure 49C:
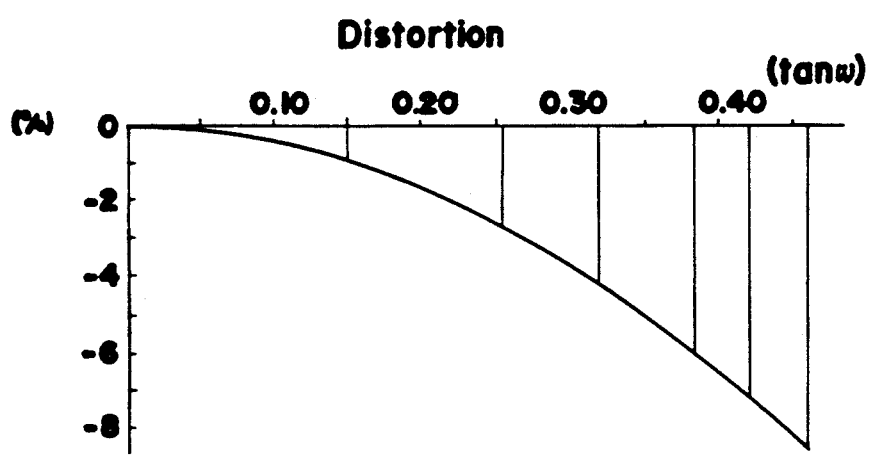
Figure 50A:
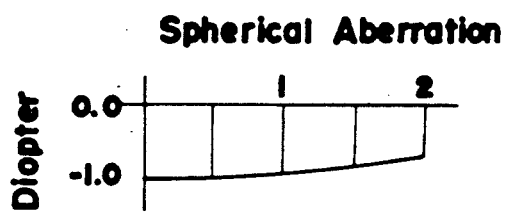
FIGS. 50a to 50c represent the aberration curves of the seventh embodiment in middle magnification condition.
Figure 51A:
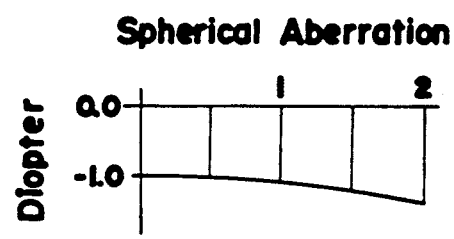
FIGS. 51a to 51c represent the aberration curves of the seventh embodiment in maximum magnification condition.
Figure 50B:
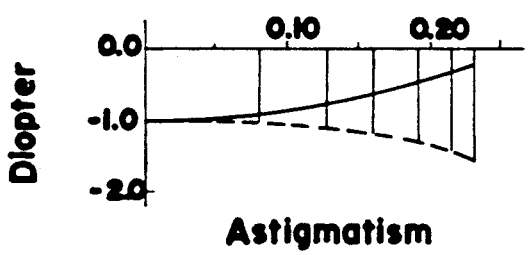
Figure 51B:
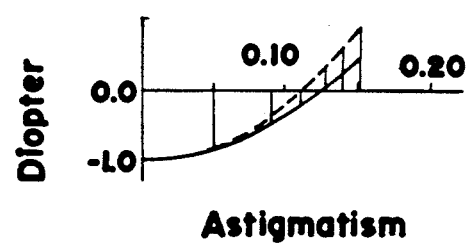
Figure 50C:
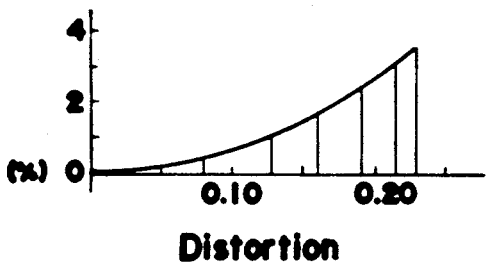
Figure 51C:
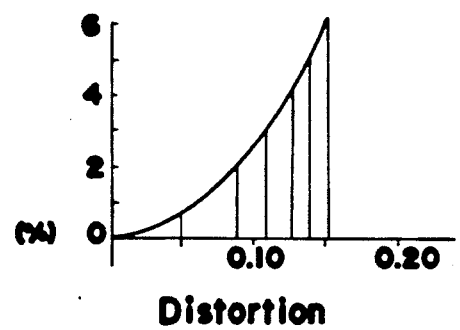
Figure 52A:
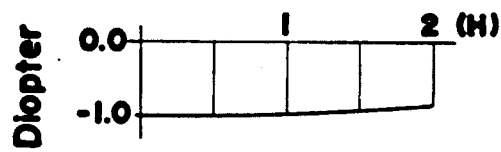
FIGS. 52a to 52c represent the aberration curves of the eighth embodiment in minimum magnification condition.
Figure 52B:
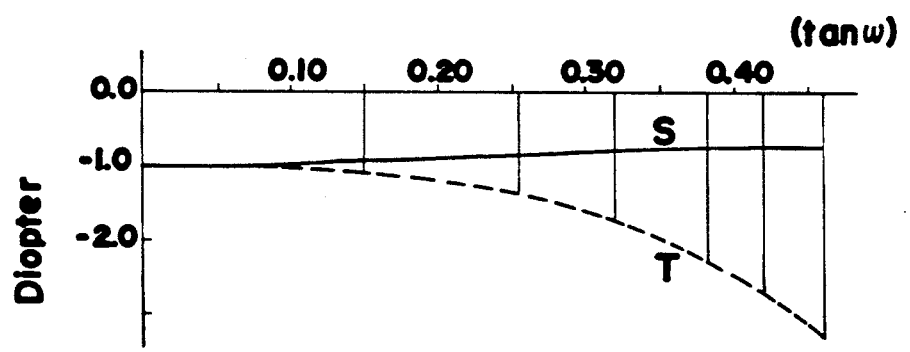
Figure 52C:
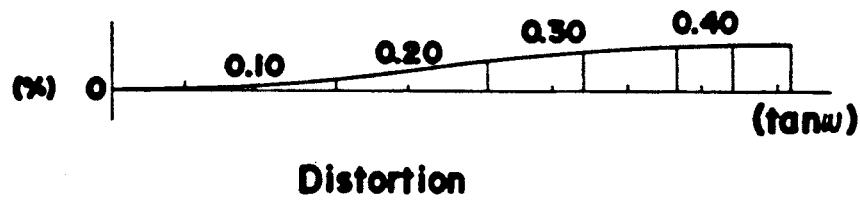
Figure 53A:
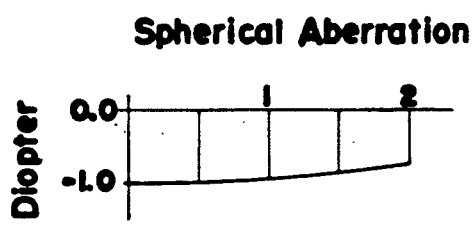
FIGS. 53a to 53c represent the aberration curves of the eighth embodiment in middle magnification condition.
Figure 54A:
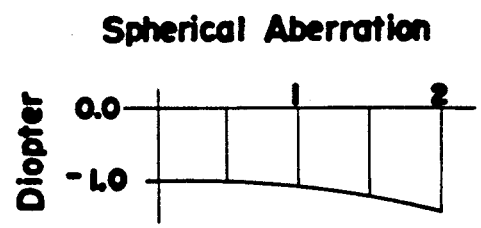
FIGS. 54a to 54c represent the aberration curves of the eighth embodiment in maximum magnification condition.
Figure 53B:
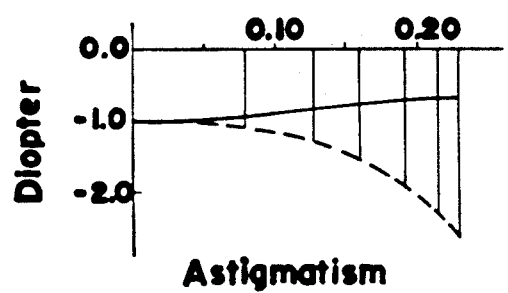
Figure 54B:
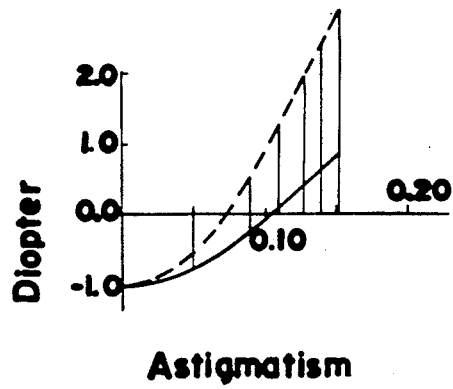
Figure 53C:
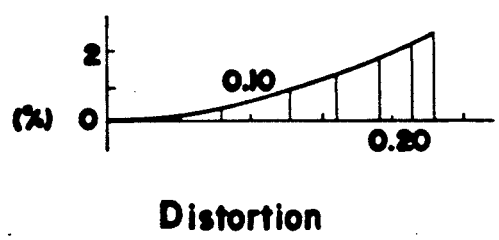
Figure 54C:
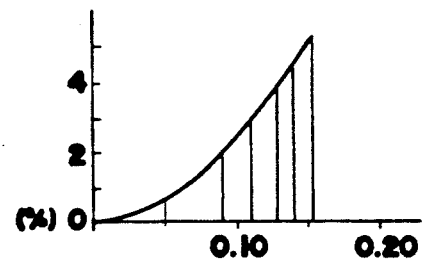
Figure 55A:
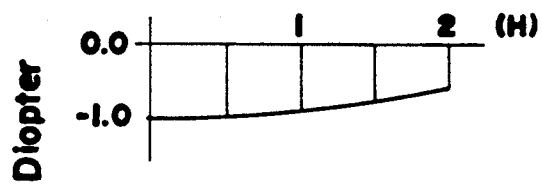
FIGS. 55a to 55c represent the aberration curves of the ninth embodiment in minimum magnification condition.
Figure 55B:
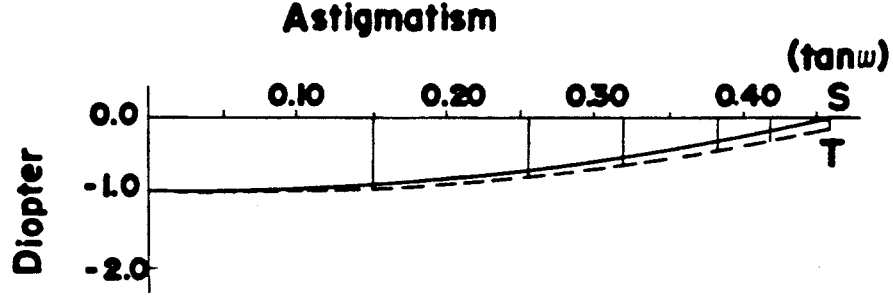
Figure 55C:
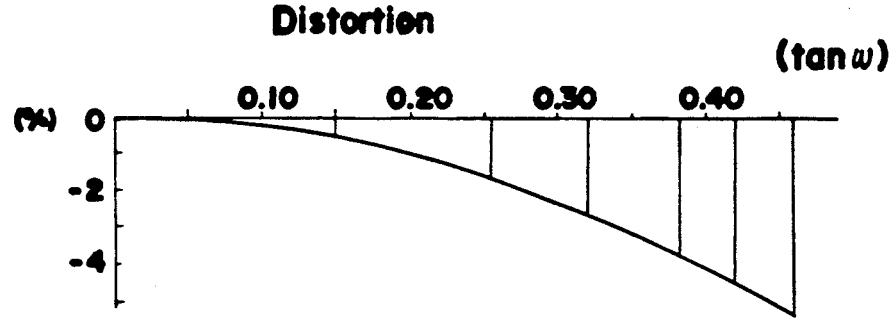
Figure 56A:
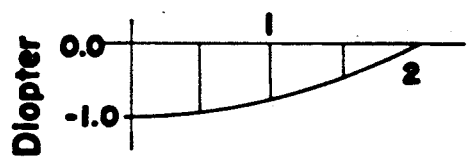
FIGS. 56a to 56c represent the aberration curves of the ninth embodiment in middle magnification condition.
Figure 57A:
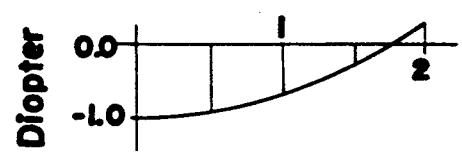
FIGS. 57a to 57c represent the aberration curves of the ninth embodiment in maximum magnification condition.
Figure 56B:
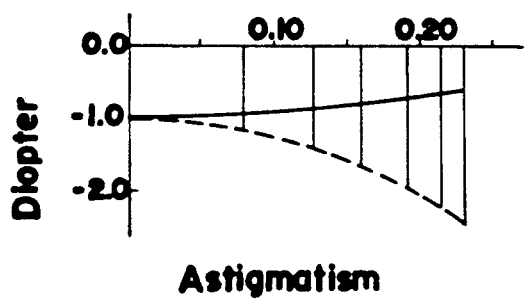
Figure 57B:
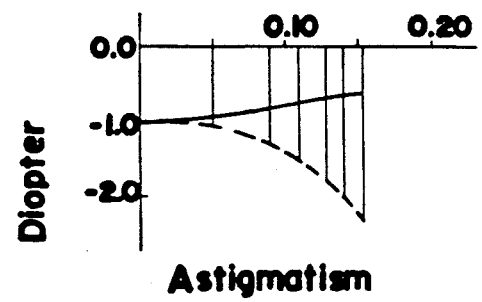
Figure 56C:
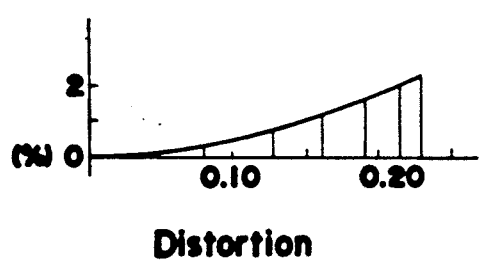
Figure 57C:
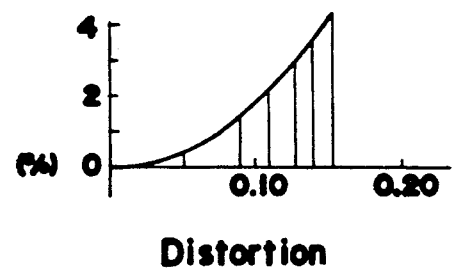
Figure 58A:
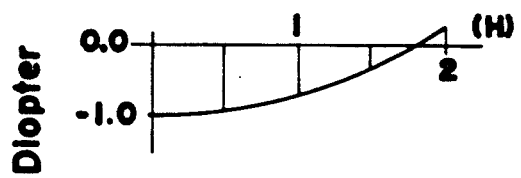
FIGS. 58a to 58c represent the aberration curves of the tenth embodiment in minimum magnification condition.
Figure 58B:
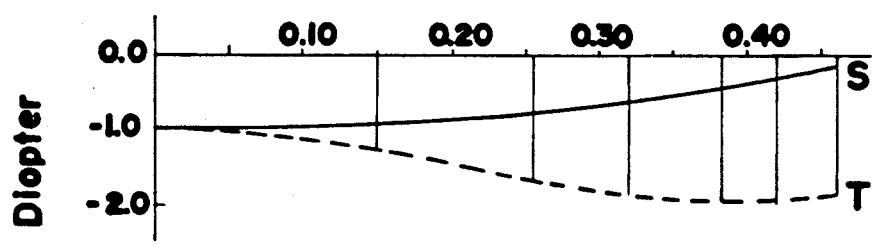
Figure 58C:
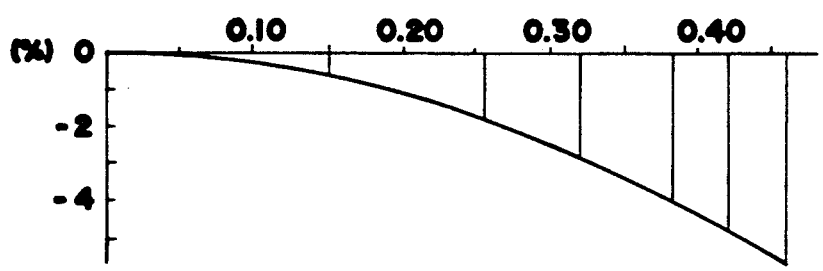
Figure 59A:
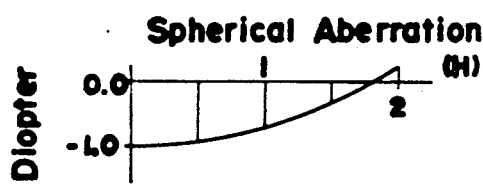
FIGS. 59a to 59c represent the aberration curves of the tenth embodiment in middle magnification condition.
Figure 60A:
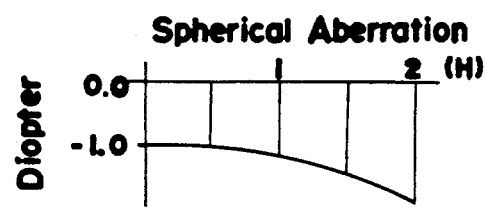
FIGS. 60a to 60c represent the aberration curves of the tenth embodiment in maximum magnification condition.
Figure 59B:
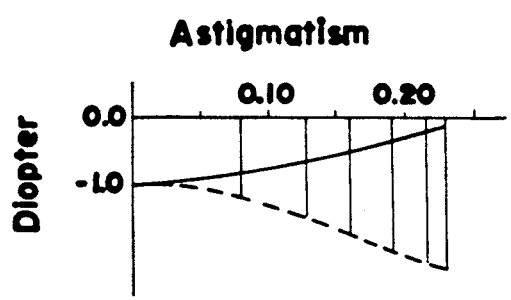
Figure 60B:
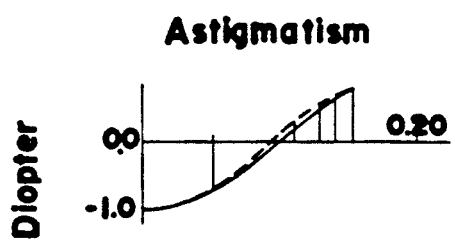
Figure 59C:
Figure 60C:
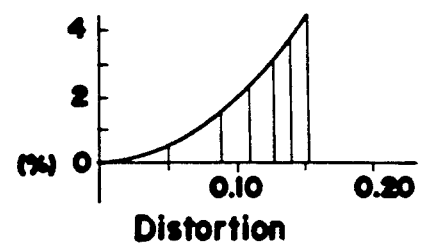

The following description is provided to enable any person skilled in the optical and camera field to make and use the invention and sets forth the best modes contemplated by the inventors for carrying out their invention. Various modification, however, will remain readily apparent to those skilled in the art, since the generic principles of the present invention have been defined herein specifically to provide a relatively economical and easily manufactured compact viewfinder optical system. The derivation of the formulas and the relation of the powers set forth herein can be accomplished with the assistance of a computer. The present invention represents the parameters of a compromise balance of acceptable aberrations which can be relatively easily manufactured to provide a low cost viewfinder optical system.

In the drawings, schematic cross sectional views disclose the position of the lens groups and the lens elements in the minimum, middle and maximum magnification conditions.

As shown in FIGS. 1 to 30, the present invention provides a variable magnification viewfinder optical system, comprising from the object side: objective lens group (Lo) of a positive refractive power, including a first lens unit (Lo$_1$) of a negative refractive power and a second lens unit (Lo$_2$) of a positive refractive power, said first and second lens units (Lo$_1$) and (Lo$_2$) being shiftable along the optical axis of the optical system for changing the magnification of the optical system; condenser lens group (Lc) of a positive refractive power; and eyepiece lens group (Le) of a negative refractive power; wherein the objective lens group (Lo) forms a real image of an object and the real image can be observed through the eyepiece lens group (Le); and wherein the optical system fulfills the following conditions;

$$-0.09/\text{mm} < 1/f_1 < -0.03/\text{mm} \tag{1}$$

$$0.04/\text{mm} < 1/f_2 < 0.11/\text{mm} \tag{2}$$

$$-0.1/\text{mm} < f_e/(f_1 \cdot f_2) < -0.035/\text{mm} \tag{3}$$

wherein:

$f_1$ represents focal length of the first lens unit (Lo$_1$) of the objective lens group in millimeters;

$f_2$ represents focal length of the second lens unit (Lo$_2$) of the objective lens group in millimeters; and $f_e$ represents focal length of the eyepiece lens group (Le) in millimeters.

Figure 65:
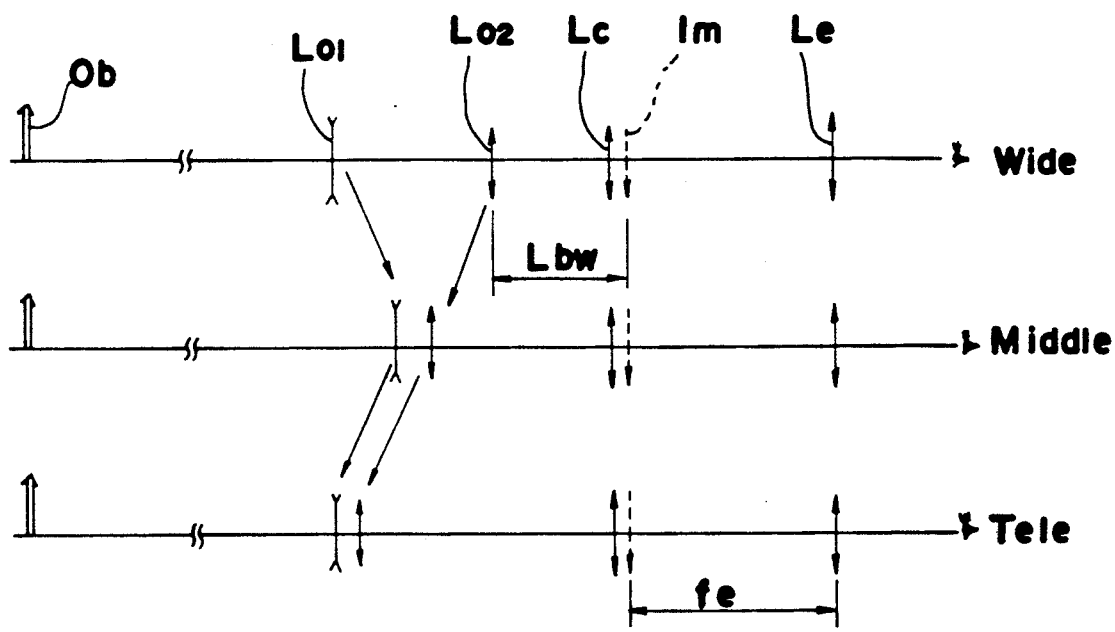
FIG. 65 represents a schematic view of the present invention.

Initially, the principle of the present invention will be explained with reference to FIG. 65. In FIG. 65, (Im) represents a position on which a real image of an object is formed by the objective lens group (Lo). In the variable magnification viewfinder optical system in which a real image of an object is once formed therein, an erecting system, for inverting the real image into an erect image, can not be located in a space in which any movable lens group is shiftable for altering the finder magnification. Contrary, the eyepiece lens group (Le) should be designed so that any aberrations generated by the eyepiece lens group (Le) are corrected well within the eyepiece lens group (Le). Therefore, it is impossible to shorten the focal length of the eyepiece lens group (Le) over a predetermined range.

If the erecting system is located at a space formed between the real image position (Im) and the eyepiece lens group (Le), the finder magnification of the whole optical system decreases because the focal length of the eyepiece lens group (Le) should be extended. In such a situation, if the focal length of the objective lens group (Lo) is extended, the total length of the whole optical system should be extended since the back focal length of the objective lens group (Lo) is also extended. The extension of the total length of the whole optical system can be controlled by shortening both of the focal length of the eyepiece lens group (Le) and the focal length of the objective lens group (Lo). However, it becomes difficult to well correct all of the aberrations by shortening both focal lengths over their respective limits. The respective limits of the focal lengths of the eyepiece lens group (Le) and the objective lens group (Lo) for maintaining well corrected aberrations must be extended in accordance with an increase of the desirable minimum finder magnification and an increase of the desirable ratio of change of finder magnification.

On the other hand, the amount of shift of the objective lens group (Lo), required for obtaining a sufficient ratio of change of finder magnification, should be increased, if the sufficient ratio of change of finder magnification is achieved only by the shift of the objective lens group (Lo). Here, it is easy to correct the aberrations by extending the focal length of the objective lens group (Lo). However, this causes an extension of the total length of the whole optical system by the extension of the back focal length of the objective lens group (Lo) in addition to the increase of the amount of shift thereof.

Figure 61:
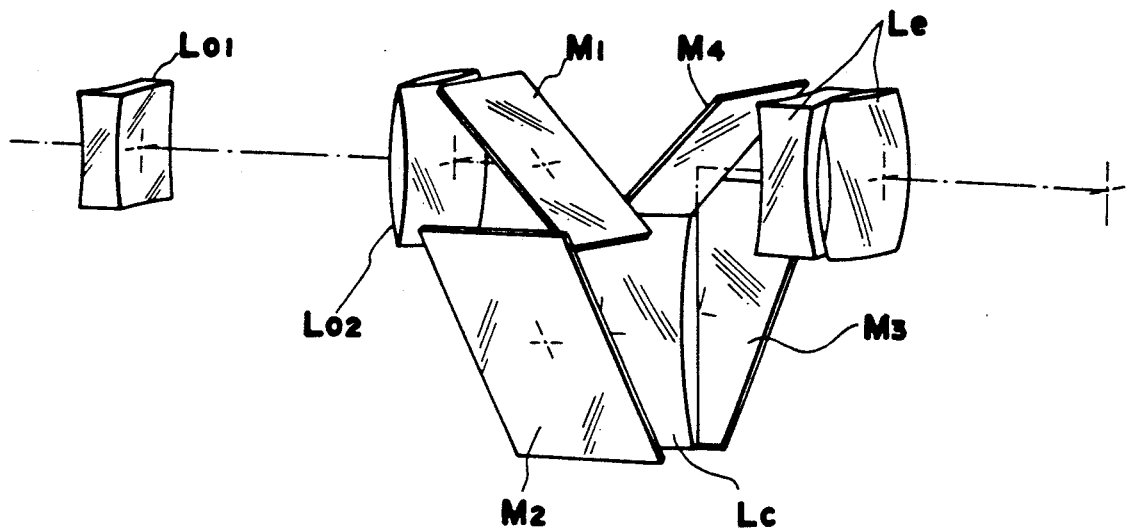
FIG. 61 represents a perspective view of the second embodiment in minimum magnification condition.
Figure 62:
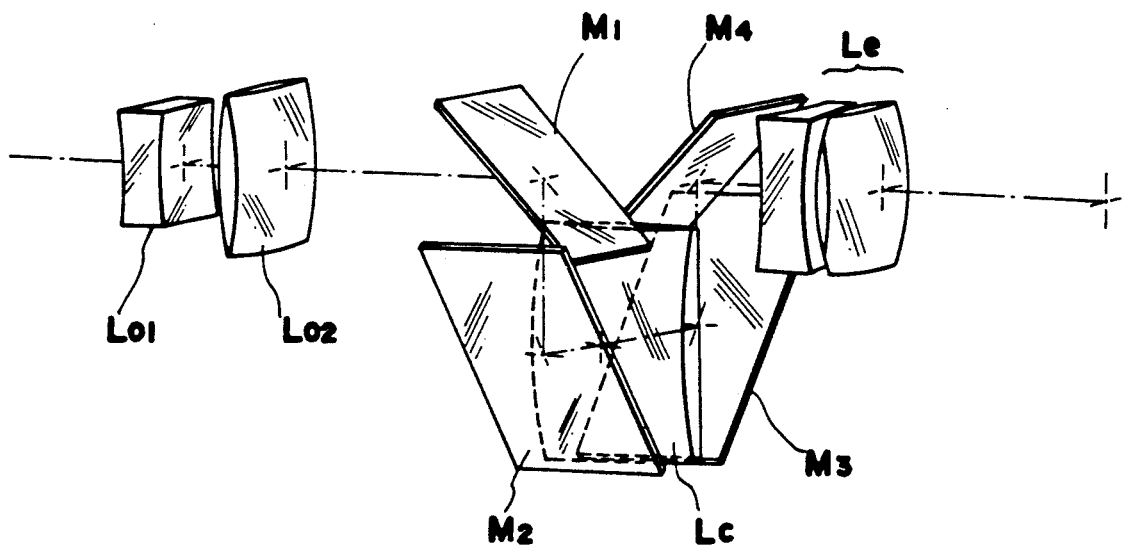
FIG. 62 represents a perspective view of the second embodiment in middle magnification condition.
Figure 64:
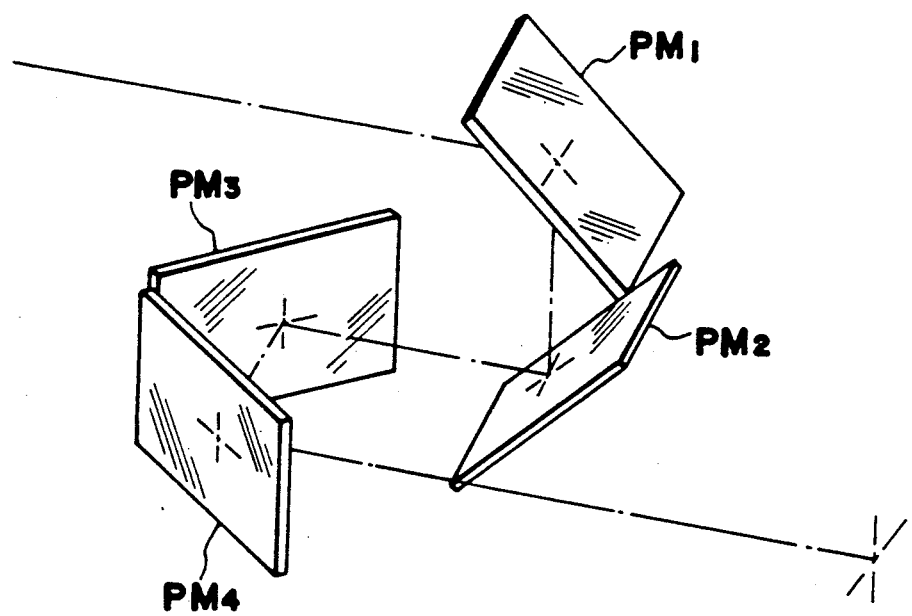
FIG. 64 represents a perspective view of polo mirror system usable in the present invention.

In the present invention, the objective lens group (Lo) is divided into, from the object side, the first negative lens unit (Lo$_1$) and the second positive lens unit (Lo$_2$) for extending the back focal length of the objective lens group (Lo), and a space for locating the image erecting system is provided in front of and behind the condenser lens group (Lc). In the present invention, if $\beta_2$ represents the lateral magnification of the second lens unit (Lo$_2$), the range of changing the finder magnification is set at both sides of $\beta_2 = -1$, so that the total length of the objective lens group (Lo) should not be changed excessively. In such condition, the relation among the focal lengths of the first and second lens units (Lo$_1$) and (Lo$_2$), the focal length of the eyepiece lens group (Le) are determined for achieving a sufficient ratio of change of finder magnification reaching 2.0, and a minimum finder magnification of 0.4. According to the present invention, if four mirrors (PM$_1$), (PM$_2$), (PM$_3$) and (PM$_4$) as shown in FIG. 64 are used as the erecting system, the condenser lens group (Lc) can be located in front of the mirror (PM$_1$), between the mirrors (PM$_1$) and (PM$_2$), between the mirrors (PM$_2$) and (PM$_3$) as shown in FIGS. 61 and 62, between the mirrors (PM$_3$) and (PM$_4$), and behind the mirror (PM$_4$).

Condition (1) limits the refractive power of the first lens unit (Lo$_1$). If the upper limit of the condition (1) is violated, the focal length of the objective lens group (Lo) becomes undesirably long, and this causes an increase of the amount of shift of the objective lens group (Lo) in addition to the undesirable extension of the total length of the whole optical system. Contrary, if the lower limit of the condition (1) is violated, it becomes difficult to well correct the aberrations since the focal length of the objective lens group (Lo) becomes excessively short. It causes a difficulty for achieving a sufficient ratio of change of finder magnification reaching 2.0 with maintaining the well corrected aberrations. Especially, it becomes difficult to well correct the distortion.

Condition (2) limits the refractive power of the second lens unit (Lo$_1$). If the upper limit of the condition (2) is violated, it becomes difficult to well correct the aberrations since the focal length of the objective lens group (Lo) becomes excessively short. It causes difficulty in achieving a sufficient ratio of change of finder magnification reaching 2.0 with maintaining well corrected aberrations. Contrary, if the lower limit of the condition (1) is violated, the focal length of the objective lens group (Lo) becomes undesirably long, and this causes an increase of the amount of shift of the objective lens group (Lo) in addition to the undesirable extension of the total length of the whole optical system.

Condition (3) is provided for limiting a relation between the focal lengths of the first and second lens units (Lo$_1$) and (Lo$_2$) and that of the eyepiece lens group (Le) in order to achieve a sufficient ratio of change of finder magnification reaching 2.0 and the minimum finder magnification of 0.4 while maintaining well corrected aberrations. If the upper limit of the condition (3) is violated, it becomes difficult to well correct the aberrations, although it becomes easy to increase the minimum finder magnification. Especially, if the upper limit of the condition (3) is violated by shortening the focal length of the eyepiece lens group (Le), it becomes difficult to well correct the aberrations while keeping a good balance therebetween. If the lower limit of the condition (3) is violated, it becomes difficult to well correct the aberrations with achieving the sufficient ratio of change of finder magnification reaching 2.0.

It is desirable to further fulfill the following conditions in order to achieve the sufficient ratio of change of finder magnification reaching 2.0 with maintaining the minimum finder magnification of 0.4:

$$|r_{1B}/r_{1F}| < 6 \quad (4)$$

$$|r_{2B}/r_{2F}| < 2 \quad (5)$$

$$0.9 < f_{oT}/f_e < 3 \quad (6)$$

wherein:

$r_{1B}$ represents a radius of curvature of a lens surface located at the object side in the first lens unit of the objective lens group;

$r_{1F}$ represents a radius of curvature of a lens surface located at the eye side in the first lens unit of the objective lens group;

$r_{2B}$ represents a radius of curvature of a lens surface located at the object side in the second lens unit of the objective lens group;

$r_{2F}$ represents a radius of curvature of a lens surface located at the eye side in the second lens unit of the objective lens group; and $f_{oT}$ represents focal length of the objective lens group at the largest magnification condition.

If either of the upper limit of condition (4) and the lower limit thereof is violated, it is not suitable for the practical use since the difference between the distortion generated in the minimum finder magnification condition and that in the maximum finder magnification condition in addition to the undesirable decrease of the finder magnification.

If either of the upper limit of condition (5) and the lower limit thereof is violated, the difference between the astigmatism generated in the minimum finder magnification condition and that in the maximum finder magnification condition becomes excessively large, this causes the difficulty of correcting the astigmatism and the distortion while keeping a good balance therebetween in the entire finder magnification range and with achieving a sufficient high finder magnification ratio.

Condition (6) is determined for the purpose of maintaining the minimum finder magnification of 0.4 with keeping the sufficient high finder magnification ratio. If the upper limit of condition (6) is violated, since the finder magnification become too large beyond the sufficient range, it becomes difficult to achieve the good optical performance of the viewfinder optical system with keeping the sufficient high finder magnification ratio. Contrary, if the lower limit of condition (6) is violated, it is not favorable for the practical use because the minimum finder magnification becomes excessively small.

With respect to the conditions (4) and (6), more desirable ranges are as follows:

$$|r_{1B}/r_{1F}| < 3 \quad (4')$$

$$1.1 < f_{oT}/f_e < 3 \quad (6')$$

It is further desirable to constitute the condenser lens group (Lc) by a single positive lens element and a single negative lens element and to fulfill the following conditions:

$$\nu_e P > 45 \quad (7)$$

$$\nu_e N < 40 \quad (8)$$

$$0.5 < r_e P/r_e N < 0.95 \quad (9)$$

$$-0.8 < r_{eB}/f_e < -0.35 \quad (10)$$

$$-0.9 < f_e N/f_e < -0.4 \quad (11)$$

wherein:

$\nu_e P$ represents an Abbe number of the positive lens element included in the eyepiece lens group (Le);

$\nu_e N$ represents an Abbe number of the negative lens element included in the eyepiece lens group (Le);

$r_e P$ represents a radius of curvature of a lens surface of the positive lens element faced to the negative lens element;

$r_e N$ represents a radius of curvature of a lens surface of the negative lens element faced to the positive lens element;

$r_{eB}$ represents radius of curvature of a lens surface located at the eye side in the eyepiece lens group (Le); and $f_e N$ represents focal length of the negative lens element of the eyepiece lens group (Le).

Conditions (7) and (8) are determined for controlling the chromatic aberration generated in the eyepiece lens group (Le) and that generated in the whole optical system in order to preventing any colored blur of a photographic frame indicated in the finder image and that of the finder image itself. If either of the conditions (7) and (8) is violated, it becomes difficult to well correct the chromatic aberration generated in the eyepiece lens group (Le) and that generated in the whole optical system.

Condition (9) limits a ratio of a radius of curvature of a lens surface faced to the negative lens element in the positive lens element to a radius of curvature of a lens surface faced to the positive lens element in the negative lens element, in order to cancel any aberrations generated by one of both lens surfaces by corresponding aberrations generated by another lens surface with each other.

Condition (10) limits a radius of curvature of a lens surface located at the eye side in the eyepiece lens group (Le) in relation to a focal length of the negative lens element of the eyepiece lens group (Le). If the upper limit of the condition (10) is violated, the astigmatism is deteriorated in addition to the decrease of the finder magnification. If the lower limit of the condition (10) is violated, both of the distortion and the astigmatism are deteriorated. In both cases, it becomes difficult to well correct aberrations since either of the aberrations is deteriorated over a correctable range.

Condition (11) defines a ratio between a focal length of the negative lens in the eyepiece lens group (Le) and a compound focal length of the eyepiece lens group (Le). Namely, the condition (11) is effective for well correcting chromatic aberrations generated both in the eyepiece lens group (Le) and in the whole optical system.

It is further desirable to apply at least one aspheric surface to the objective lens group (Lo) for further correcting any aberrations. The field curvature generated by the objective lens group (Lo) is further corrected by introducing at least one aspheric surface to the objective lens group (Lo). Contrary, it is also desirable to apply, to the condenser lens group (Lc), at least one aspheric surface whose radius of curvature increases in accordance with the increase of the distance measured from the optical axis to the lens surface to which the aspheric surface is applied, for well correcting the distortion and for controlling the change of the distortion all over the variable magnification range. Furthermore, it is also desirable to apply, to the eyepiece lens group (Le), at least one aspheric surface whose radius of curvature increases in accordance with the increase of the distance measured from the optical axis to the lens surface to which the aspheric surface is applied, for well correcting the distortion, the astigmatism, and the spherical aberration.

The following Tables 1 to 10 disclose, respectively, the first through tenth embodiments of the present invention. In the Tables, r is the radius of curvature with respective sub number indicating the surfaces from the object to eye side along the optical axis, d represents the axial distance and includes both air spaces and the actual thickness of the lens elements along the optical axis, N equals the refractive index and again, the sub numbers refer to the particular optical element from the object to the eye side, and finally, $\nu$ equals the Abbe number and the sub numbers refer to the specific lens elements from the object to the eye side. The asterisk (*) represents the aspheric surface, and its coefficients are shown in respective Tables.

Here, the shape of the aspheric surface is represented by the following equation, if a point designated on the aspheric surface is expressed by (X,Y,Z);

$$X = f(\Phi)$$
$$= \{C_0\Phi^2/[1 + (1 - \epsilon C_0^2\Phi^2)^{\frac{1}{2}}]\} + \sum_{i=3}^{\infty} A_i\Phi^i$$
$$\Phi^2 = Y^2 + Z^2$$

wherein:

X represents a distance measured along the optical surface from a top point on which the optical axis intersects the aspheric surface;

$\Phi$ represents a distance measured perpendicularly to the optical axis from the top point, that is $\Phi = (Y^2 + Z^2)^{\frac{1}{2}}$;

$C_0$ represents a radius of curvature of the aspheric surface on the top point;

$\epsilon$ represents an aspheric coefficient of the aspheric surface; and $A_i$ represents a curvature of the aspheric surface of $i$—the order.

In all of the embodiments shown in Tables 1 to 10, Ai are defined by zero, and the shape of the aspheric surface is represented by the aspheric coefficient $\epsilon$. However, the aspheric coefficient $\epsilon$ can be expanded to a plurality of Ai.

Figure 63:
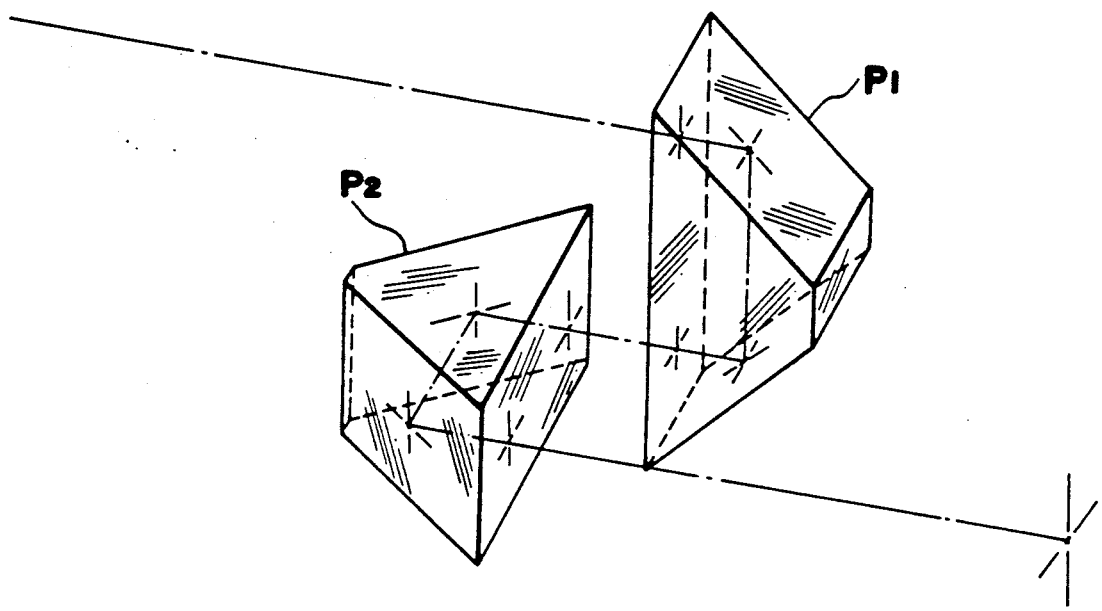
FIG. 63 represents a perspective view of a polo prism system usable in the present invention.

The space formed between the objective lens group (Lo) and the condenser lens group (Lc) and the space formed between the condenser lens group (Lc) and the eyepiece lens group (Le) are filled with air in all of the embodiments shown in Tables 1 to 10. However, if the viewfinder optical system of either of the embodiments is actually mounted on a camera body, it is desirable to use a reflection mirror or a parro prism as shown in FIG. 63 for inverting a real image formed by the objective lens group (Lo). In the embodiments, the objective lens group (Lo) forms a real image of an object on a position apart from the condenser lens group (Lc) by 1 mm—1.5 mm. It is effective for preventing from the difficulty of finder observation due to any dust attached to the lens surface of the condenser lens group (Lc). In the embodiments, the condenser lens group (Lc) consists of a single lens element. However, it is also favorable to constitute the condenser lens group (Lc) by a plurality of lens elements if used with the polo prism. The objective lens group (Lo) forms a real image of an object behind the condenser lens group (Lc) in all of the embodiments except for the embodiment 3. However, the position on which the real image is formed should be defined while providing space into which the viewfinder optical system should be included and the arrangement thereof. It is also desirable to seal up any spaces formed between successive fixed lens groups in order to avoiding any enter of the dust into the spaces. For example, if the real image is formed behind the condenser lens group (Lc), it is only necessary for sealing up the space formed between the condenser lens group (Lc) and the eyepiece lens group (Le) to avoid any enter of the dust into the space after the viewfinder optical system is once mounted on the camera body.

In the embodiments, a spaced formed between two successive lens elements in the eyepiece lens group (Le) can be changed for controlling the diopter within a sufficient adjustable range, without changing the finder magnification. In this case, it is possible to shift one of the positive and negative lens element for changing the space while making another of the positive and negative lens element stationary. Optical performance achieved by shifting the negative lens element is almost identical to that achieved by shifting the positive lens element. For example, in a viewfinder optical system of the following embodiment 1, a diopter in the center of finder field and finder magnification when the positive lens element ($G_6$) is shifted for controlling the diopter are represented in the following Table 11. As shown in the Table 11, the diopter can be controlled within a broad range of $-4.3$ diopter to $+2.6$ diopter.

Diopter is defined by the reciprocal of the focal length of the lens system. In the present invention, the real image of an object is formed adjacent the condenser lens group by the objective lens group having a positive refractive power and an enlarged virtual image of this real image is formed by the eyepiece lens group having a negative refractive power. In the following Tables, the term "diopter in center" refers to a diopter value being calculated by tracing the paraxial ray through the optical system.

As can be readily appreciated, it is possible to deviate from the following embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

TABLE 1

| Embodiment 1 | | | | |
|---|---|---|---|---|
| Radius of Curvature | Axial Distance | Refractive Index (Nd) | Abbe Number | Aspheric Coefficient ($\epsilon$) |
| $Lo_1$ G1 $\quad r_1$ −42.13 | $d_1$ 1.148 | $N_1$ 1.713 | $v_1$ 53.93 | −4.000107 |
| $r_2$ 46.17 | $d_2$ variable | | | |
| G2 $\quad r_3$ 24.515 | $d_3$ 5.0 | $N_2$ 1.4914 | $v_2$ 57.32 | −3.608165 |
| $Lo_2 \quad r_4$ −13.289 | $d_4$ 0.5 | | | |
| G3 $\quad r_5$ −9.178 | $d_5$ 1.5 | $N_3$ 1.584 | $v_3$ 31.00 | |
| $r_6$ −10.782 | $d_6$ variable | | | |
| Lc G4 $\quad r_7$ 16.809 | $d_7$ 3.4 | $N_4$ 1.4914 | $v_4$ 57.32 | −1.316301 |
| $r_8$ −57.466 | $d_8$ 25.5 | | | |
| G5 $\quad r_9$ −94.616 | $d_9$ 1.3 | $N_5$ 1.584 | $v_5$ 31.00 | |
| $r_{10}$ 9.209 | | | | |

TABLE 1-continued

Embodiment 1

| | | | | | |
|---|---|---|---|---|---|
| Le | | $d_{10}$ 0.5 | | | |
| | $r_{11}$ 8.000 | | | | −0.0075 |
| $G_6$ | | $d_{11}$ 3.7 | $N_6$ 1.4914 | $\nu_6$ 57.82 | |
| | $r_{12}$ −13.181 | | | | |
| | | $d_{12}$ 13.0 | | | |
| | $r_{13}$ pupil | | | | |

| | $d_2$ | $d_6$ | diopter in center | finder magnification |
|---|---|---|---|---|
| Standard | 26.596 | 27.562 | −0.909 | 0.508 |
| Middle | 7.024 | 39.572 | −0.909 | 1.016 |
| Tele | 0.5 | 51.582 | −0.909 | 1.524 |
| frame | | | −1.024 | |

$$1/f_1 = -0.0325$$
$$1/f_2 = 0.0461$$
$$f_e/(f_1 \cdot f_2) = -0.0451$$
$$r_{1B}/r_{1F} = -1.0959$$
$$r_{2B}/r_{2F} = -0.4398$$
$$f_{oT}/f_e = 1.7006$$
$$\nu eP = 57.82$$
$$\nu eN = 31.00$$
$$r_{eP}/r_{eN} = 0.8687$$
$$r_{eB}/f_e = -0.4390$$
$$f_{eN}/f_e = -0.4764$$

TABLE 2

Embodiment 2

| | Radius of Curvature | Axial Distance | Refractive Index (Nd) | Abbe Number | Aspheric Coefficient (ε) |
|---|---|---|---|---|---|
| | $r_1$ −24.00 | | | | −25.00 |
| $Lo_1$ G1 | | $d_1$ 1.5 | $N_1$ 1.584 | $\nu_1$ 31.00 | |
| | $r_2$ 34.7955 | | | | |
| | | $d_2$ variable | | | |
| | $r_3$ 13.5 | | | | −4.9 |
| $Lo_2$ G2 | | $d_3$ 2.5 | $N_2$ 1.4914 | $\nu_2$ 57.82 | |
| | $r_4$ −17.912 | | | | |
| | | $d_4$ variable | | | |
| | $r_5$ 13.00 | | | | −0.8 |
| Lc G3 | | $d_5$ 3.5 | $N_3$ 1.4914 | $\nu_3$ 57.82 | |
| | $r_6$ −200.00 | | | | |
| | | $d_6$ 24.5 | | | |
| | $r_7$ −55.00 | | | | |
| G4 | | $d_7$ 1.5 | $N_4$ 1.584 | $\nu_4$ 31.00 | |
| | $r_8$ 12.00 | | | | |
| Le | | $d_8$ 0.5 | | | |
| | $r_9$ 9.5 | | | | −0.7 |
| G5 | | $d_9$ 3.0 | $N_5$ 1.4914 | $\nu_5$ 57.82 | |
| | $r_{10}$ −12.78 | | | | |
| | | $d_{10}$ 13.0 | | | |
| | $r_{11}$ pupil | | | | |

| | $d_2$ | $d_4$ | diopter in center | finder magnification |
|---|---|---|---|---|
| Standard | 19.2 | 20.352 | −1.000 | 0.416 |
| Middle | 4.95 | 29.431 | −1.000 | 0.831 |
| Tele | 0.2 | 38.509 | −1.000 | 1.247 |
| frame | | | −1.000 | |

$$1/f_1 = -0.0415$$
$$1/f_2 = -0.0622$$
$$f_e/(f_1 \cdot f_2) = -0.0749$$
$$r_{1B}/r_{1F} = -1.4498$$
$$r_{2B}/r_{2F} = -1.3268$$
$$f_{oT}/f_e = 1.4061$$
$$\nu eP = 57.82$$
$$\nu eN = 31.00$$
$$r_{eP}/r_{eN} = 0.7917$$
$$r_{eB}/f_e = -0.4405$$
$$f_{eN}/f_e = -0.5766$$

TABLE 3

Embodiment 3

| | Radius of Curvature | Axial Distance | Refractive Index (Nd) | Abbe Number | Aspheric Coefficient (ε) |
|---|---|---|---|---|---|
| | $r_1$ −21.00 | | | | −8.00 |

TABLE 3-continued

Embodiment 3

| | | | | | |
|---|---|---|---|---|---|
| Lo₁ G1 | | d₁ 1.0 | N₁ 1.584 | ν₁ 31.00 | |
| | r₂ 37.4935 | | | | |
| | | d₂ variable | | | −4.6 |
| | r₃ 14.0 | | | | |
| Lo₂ G₂ | | d₃ 2.5 | N₂ 1.4914 | ν₂ 57.82 | |
| | r₄ −17.63 | | | | |
| | | d₄ variable | | | −1.2 |
| | r₅ 14.00 | | | | |
| Lc G₃ | | d₅ 3.5 | N₃ 1.4914 | ν₃ 57.82 | |
| | r₆ −100.00 | | | | |
| | | d₆ 20.07 | | | |
| | r₇ −100.00 | | | | |
| G₄ | | d₇ 1.3 | N₄ 1.584 | ν₄ 31.00 | |
| | r₈ 9.3 | | | | |
| Le | | d₈ 0.5 | | | 0.01 |
| | r₉ 8.0 | | | | |
| G₅ | | d₉ 3.6 | N₅ 1.4914 | ν₅ 57.82 | |
| | r₁₀ −13.17 | | | | |
| | | d₁₀ 13.0 | | | |
| | r₁₁ pupil | | | | |

| | d₂ | d₄ | diopter in center | finder magnification |
|---|---|---|---|---|
| Standard | 19.0 | 26.277 | −1.001 | 0.511 |
| Middle | 5.7 | 36.09 | −0.999 | 1.016 |
| Tele | 1.2 | 46.0 | −1.000 | 1.525 |
| frame | | | −1.000 | |

$$1/f_1 = -0.0437$$
$$1/f_2 = -0.0613$$
$$f_e/(f_1 \cdot f_2) = -0.0784$$
$$r_{1B}/r_{1F} = -1.7854$$
$$r_{2B}/r_{2F} = -1.2593$$
$$f_{oT}/f_e = 1.4221$$
$$\nu eP = 57.82$$
$$\nu eN = 31.00$$
$$r_{eP}/r_{eN} = 0.8602$$
$$r_{eB}/f_e = -0.4496$$
$$f_{eN}/f_e = -0.4952$$

TABLE 4

Embodiment 4

| | Radius of Curvature | Axial Distance | Refractive Index (Nd) | Abbe Number | Aspheric Coefficient (ε) |
|---|---|---|---|---|---|
| | r₁ 29.202 | | | | |
| G₁ | | d₁ 1.2 | N₁ 1.584 | ν₁ 31.00 | |
| | r₂ 158.158 | | | | 0.641787 |
| Lo₁ | | d₂ 2.0 | | | |
| | r₃ −35.114 | | | | |
| G₂ | | d₃ 1.2 | N₂ 1.584 | ν₂ 31.00 | |
| | r₄ 14.811 | | | | −1.0 |
| | | d₄ variable | | | 0.846226 |
| | r₅ −25.147 | | | | |
| G₃ | | d₅ 4.0 | N₃ 1.4914 | ν₃ 57.82 | |
| | r₆ −13.247 | | | | |
| Lo₂ | | d₆ 1.0 | | | |
| | r₇ 692.674 | | | | |
| G₄ | | d₇ 2.5 | N₄ 1.4914 | ν₄ 57.82 | |
| | r₈ −16.52 | | | | |
| | | d₈ variable | | | |
| | r₉ 14.3 | | | | −0.6 |
| Lc G₅ | | d₉ 3.4 | N₅ 1.4914 | ν₅ 57.82 | |
| | r₁₀ −75.00 | | | | |
| | | d₁₀ 25.5 | | | |
| | r₁₁ −94.616 | | | | |
| G₆ | | d₁₁ 1.3 | N₆ 1.584 | ν₆ 31.00 | |
| | r₁₂ 9.209 | | | | |
| Le | | d₁₂ 0.5 | | | −0.15 |
| | r₁₃ 8.00 | | | | |
| G₇ | | d₁₃ 3.7 | N₇ 1.4914 | ν₇ 57.82 | |
| | r₁₄ −13.181 | | | | |
| | | d₁₄ 13.0 | | | |
| | r₁₅ pupil | | | | |

| | d₄ | d₈ | diopter in center | finder magnification |
|---|---|---|---|---|
| Standard | 23.05 | 27.52 | −0.998 | 0.468 |
| Middle | 6.14 | 39.37 | −0.997 | 0.936 |

TABLE 4-continued

Embodiment 4

| | | | | |
|---|---|---|---|---|
| Tele | 0.5 | 51.22 | −1.003 | 1.403 |
| frame | | | −1.024 | |

$1/f_1 = -0.0370$         $1/f_2 = 0.0499$
$f_e/(f_1 \cdot f_2) = -0.0555$         $r_{1B}/r_{1F} = 0.5072$
$r_{2B}/r_{2F} = 0.6570$         $f_{oT}/f_e = 1.5986$
$\nu eP = 57.82$         $\nu eN = 31.00$
$r_{eP}/r_{eN} = 0.8687$         $r_{eB}/f_e = -0.4390$
$f_{eN}/f_e = -0.4764$

TABLE 5

Embodiment 5

| | Radius of Curvature | Axial Distance | Refractive Index (Nd) | Abbe Number | Aspheric Coefficient ($\epsilon$) |
|---|---|---|---|---|---|
| $G_1$ | $r_1$ −148.203 | $d_1$ 1.2 | $N_1$ 1.584 | $\nu_1$ 31.00 | |
| | $r_2$ 58.334 | | | | 0.995124 |
| $Lo_1$ | | $d_2$ 2.0 | | | |
| | $r_3$ −238.555 | | | | |
| $G_2$ | | $d_3$ 1.2 | $N_2$ 1.584 | $\nu_2$ 31.00 | |
| | $r_4$ 23.77 | | | | 0.964397 |
| | | $d_4$ variable | | | |
| | $r_5$ −125.882 | | | | |
| $G_3$ | | $d_5$ 4.0 | $N_3$ 1.4914 | $\nu_3$ 57.82 | |
| | $r_6$ −14.978 | | | | |
| $Lo_2$ | | $d_6$ 1.0 | | | |
| | $r_7$ 345.689 | | | | |
| $G_4$ | | $d_7$ 2.5 | $N_4$ 1.4914 | $\nu_4$ 57.82 | |
| | $r_8$ −26.247 | | | | |
| | | $d_8$ variable | | | |
| | $r_9$ 14.3 | | | | −0.6 |
| Lc $G_5$ | | $d_9$ 3.4 | $N_5$ 1.4914 | $\nu_5$ 57.82 | |
| | $r_{10}$ −75.00 | | | | |
| | | $d_{10}$ 25.5 | | | |
| | $r_{11}$ −94.616 | | | | |
| $G_6$ | | $d_{11}$ 1.3 | $N_6$ 1.584 | $\nu_6$ 31.00 | |
| | $r_{12}$ 9.209 | | | | |
| Le | | $d_{12}$ 0.5 | | | |
| | $r_{13}$ 8.00 | | | | −0.14 |
| $G_7$ | | $d_{13}$ 3.7 | $N_7$ 1.4914 | $\nu_7$ 57.82 | |
| | $r_{14}$ −13.181 | | | | |
| | | $d_{14}$ 13.0 | | | |
| | $r_{15}$ pupil | | | | |

| | $d_4$ | $d_8$ | diopter in center | finder magnification |
|---|---|---|---|---|
| Standard | 23.05 | 27.52 | −0.998 | 0.468 |
| Middle | 6.14 | 39.37 | −0.997 | 0.936 |
| Tele | 0.5 | 51.22 | −1.003 | 1.403 |
| frame | | | −1.024 | |

$1/f_1 = -0.0370$         $1/f_2 = 0.0499$
$f_e/(f_1 \cdot f_2) = -0.0555$         $r_{1B}/r_{1F} = 0.5072$
$r_{2B}/r_{2F} = 0.6570$         $f_{oT}/f_e = 1.5986$
$\nu eP = 57.82$         $\nu eN = 31.00$
$r_{eP}/r_{eN} = 0.8687$         $r_{eB}/f_e = -0.4390$
$f_{eN}/f_e = -0.4764$

TABLE 6

Embodiment 6

| | Radius of Curvature | Axial Distance | Refractive Index (Nd) | Abbe Number | Aspheric Coefficient ($\epsilon$) |
|---|---|---|---|---|---|
| $G_1$ | $r_1$ 41.346 | $d_1$ 1.2 | $N_1$ 1.584 | $\nu_1$ 31.00 | |
| | $r_2$ 27.047 | | | | 0.750491 |
| $Lo_1$ | | $d_2$ 2.0 | | | |
| | $r_3$ −79.748 | | | | |
| $G_2$ | | $d_3$ 1.2 | $N_2$ 1.584 | $\nu_2$ 31.00 | |
| | $r_4$ 26.443 | | | | 0.590166 |
| | | $d_4$ variable | | | |
| | $r_5$ −212.904 | | | | |
| $G_3$ | | $d_5$ 4.0 | $N_3$ 1.4914 | $\nu_3$ 57.82 | |
| | $r_6$ −17.328 | | | | 0.846806 |
| $Lo_2$ | | $d_6$ 1.0 | | | |
| | $r_7$ 67.021 | | | | |
| $G_4$ | | $d_7$ 2.5 | $N_4$ 1.4914 | $\nu_4$ 57.82 | |

TABLE 6-continued

Embodiment 6

|  | | | | | |
|---|---|---|---|---|---|
| | $r_8$ −28.8 | | | | 0.869546 |
| | | $d_8$ variable | | | |
| | $r_9$ 14.3 | | | | −0.6 |
| Lc G$_5$ | | $d_9$ 3.4 | $N_5$ 1.4914 | $\nu_5$ 57.82 | |
| | $r_{10}$ −75.00 | | | | |
| | | $d_{10}$ 25.5 | | | |
| | $r_{11}$ −94.616 | | | | |
| G$_6$ | | $d_{11}$ 1.3 | $N_6$ 1.584 | $\nu_6$ 31.00 | |
| | $r_{12}$ 9.209 | | | | |
| Le | | $d_{12}$ 0.5 | | | |
| | $r_{13}$ 8.00 | | | | −0.15 |
| G$_7$ | | $d_{13}$ 3.7 | $N_7$ 1.4914 | $\nu_7$ 57.82 | |
| | $r_{14}$ −13.181 | | | | |
| | | $d_{14}$ 13.0 | | | |
| | $r_{15}$ pupil | | | | |

| | $d_4$ | $d_8$ | diopter in center | finder magnification |
|---|---|---|---|---|
| Standard | 23.4 | 26.49 | −1.000 | 0.468 |
| Middle | 6.225 | 38.53 | −1.000 | 0.936 |
| Tele | 0.5 | 50.57 | −0.999 | 1.404 |
| frame | | | −1.024 | |

$1/f_1 = -0.0370$   $1/f_2 = 0.0492$
$f_e/(f_1 \cdot f_2) = -0.0546$   $r_{1B}/r_{1F} = 0.6395$
$r_{2B}/r_{2F} = 0.1353$   $f_{oT}/f_e = 1.5986$
$\nu eP = 57.82$   $\nu eN = 31.00$
$r_{eP}/r_{eN} = 0.8687$   $r_{eB}/f_e = -0.4390$
$f_{eN}/f_e = -0.4764$

TABLE 7

Embodiment 7

| | Radius of Curvature | Axial Distance | Refractive Index (Nd) | Abbe Number | Aspheric Coefficient ($\epsilon$) |
|---|---|---|---|---|---|
| | $r_1$ 29.038 | | | | |
| G$_1$ | | $d_1$ 1.2 | $N_1$ 1.584 | $\nu_1$ 31.00 | |
| | $r_2$ 35.181 | | | | 0.599136 |
| Lo$_1$ | | $d_2$ 2.0 | | | |
| | $r_3$ −28.105 | | | | |
| G$_2$ | | $d_3$ 1.2 | $N_2$ 1.584 | $\nu_2$ 31.00 | |
| | $r_4$ 28.253 | | | | 0.740232 |
| | | $d_4$ variable | | | |
| | $r_5$ −131.19 | | | | |
| G$_3$ | | $d_5$ 4.0 | $N_3$ 1.4914 | $\nu_3$ 57.82 | |
| | $r_6$ −17.96 | | | | 0.675744 |
| Lo$_2$ | | $d_6$ 1.0 | | | |
| | $r_7$ 83.472 | | | | |
| G$_4$ | | $d_7$ 2.5 | $N_4$ 1.4914 | $\nu_4$ 57.82 | |
| | $r_8$ −22.843 | | | | 0.466598 |
| | | $d_8$ variable | | | |
| | $r_9$ 14.3 | | | | −0.6 |
| Lc G$_5$ | | $d_9$ 3.4 | $N_5$ 1.4914 | $\nu_5$ 57.82 | |
| | $r_{10}$ −75.00 | | | | |
| | | $d_{10}$ 25.5 | | | |
| | $r_{11}$ −94.616 | | | | |
| G$_6$ | | $d_{11}$ 1.3 | $N_6$ 1.584 | $\nu_6$ 31.00 | |
| | $r_{12}$ 9.209 | | | | |
| Le | | $d_{12}$ 0.5 | | | |
| | $r_{13}$ 8.00 | | | | −0.0075 |
| G$_7$ | | $d_{13}$ 3.7 | $N_7$ 1.4914 | $\nu_7$ 57.82 | |
| | $r_{14}$ −13.181 | | | | |
| | | $d_{14}$ 13.0 | | | |
| | $r_{15}$ pupil | | | | |

| | $d_4$ | $d_8$ | diopter in center | finder magnification |
|---|---|---|---|---|
| Standard | 23.095 | 26.33 | −1.000 | 0.468 |
| Middle | 6.15 | 38.21 | −0.997 | 0.936 |
| Tele | 0.5 | 50.09 | −0.997 | 1.404 |
| frame | | | −1.024 | |

$1/f_1 = -0.0370$   $1/f_2 = 0.0498$
$f_e/(f_1 \cdot f_2) = -0.0554$   $r_{1B}/r_{1F} = 0.9730$
$r_{2B}/r_{2F} = 0.1741$   $f_{oT}/f_e = 1.5986$
$\nu eP = 57.82$   $\nu eN = 31.00$
$r_{eP}/r_{eN} = 0.8687$   $r_{eB}/f_e = -0.4390$
$f_{eN}/f_e = -0.4764$

TABLE 8

Embodiment 8

| | Radius of Curvature | Axial Distance | Refractive Index (Nd) | Abbe Number | Aspheric Coefficient ($\epsilon$) |
|---|---|---|---|---|---|
| $G_1$ | $r_1$ 38.783 | $d_1$ 1.2 | $N_1$ 1.584 | $\nu_1$ 31.00 | |
| | $r_2$ 24.348 | | | | 5.283682 |
| $Lo_1$ | | $d_2$ 2.0 | | | |
| | $r_3$ 107.21 | | | | |
| $G_2$ | | $d_3$ 1.2 | $N_2$ 1.584 | $\nu_2$ 31.00 | |
| | $r_4$ 17.939 | | | | 1.749085 |
| | | $d_4$ variable | | | |
| | $r_5$ −27.556 | | | | |
| $G_3$ | | $d_5$ 4.0 | $N_3$ 1.4914 | $\nu_3$ 57.82 | |
| | $r_6$ −24.709 | | | | 0.712956 |
| $Lo_2$ | | $d_6$ 1.0 | | | |
| | $r_7$ 98.816 | | | | |
| $G_4$ | | $d_7$ 2.5 | $N_4$ 1.4914 | $\nu_4$ 57.82 | |
| | $r_8$ −13.343 | | | | |
| | | $d_8$ variable | | | |
| | $r_9$ 14.3 | | | | −0.6 |
| Lc $G_5$ | | $d_9$ 3.4 | $N_5$ 1.4914 | $\nu_5$ 57.82 | |
| | $r_{10}$ −75.00 | | | | |
| | | $d_{10}$ 25.5 | | | |
| | $r_{11}$ −94.616 | | | | |
| $G_6$ | | $d_{11}$ 1.3 | $N_6$ 1.584 | $\nu_6$ 31.00 | |
| | $r_{12}$ 9.209 | | | | |
| Le | | $d_{12}$ 0.5 | | | |
| | $r_{13}$ 8.00 | | | | −0.3 |
| $G_7$ | | $d_{13}$ 3.7 | $N_7$ 1.4914 | $\nu_7$ 57.82 | |
| | $r_{14}$ −13.181 | | | | |
| | | $d_{14}$ 13.0 | | | |
| | $r_{15}$ pupil | | | | |

| | $d_4$ | $d_8$ | diopter in center | finder magnification |
|---|---|---|---|---|
| Standard | 25.556 | 30.47 | −0.999 | 0.468 |
| Middle | 6.77 | 42.95 | −0.991 | 0.936 |
| Tele | 0.5 | 55.42 | −0.999 | 1.404 |
| frame | | | −1.024 | |

$1/f_1 = -0.0360$  $1/f_2 = 0.0462$
$f_e/(f_1 \cdot f_2) = -0.0499$  $r_{1B}/r_{1F} = 0.4625$
$r_{2B}/r_{2F} = 0.4842$  $f_{oT}/f_e = 1.5986$
$\nu eP = 57.82$  $\nu eN = 31.00$
$r_{eP}/r_{eN} = 0.8687$  $r_{eB}/f_e = -0.4390$
$f_{eN}/f_e = -0.4764$

TABLE 9

Embodiment 9

| | Radius of Curvature | Axial Distance | Refractive Index (Nd) | Abbe Number | Aspheric Coefficient ($\epsilon$) |
|---|---|---|---|---|---|
| $G_1$ | $r_1$ 30.00 | $d_1$ 1.2 | $N_1$ 1.584 | $\nu_1$ 31.00 | |
| | $r_2$ 21.286 | | | | 0.751266 |
| $Lo_1$ | | $d_2$ 2.0 | | | |
| | $r_3$ −155.00 | | | | |
| $G_2$ | | $d_3$ 1.2 | $N_2$ 1.584 | $\nu_2$ 31.00 | |
| | $r_4$ 23.28 | | | | 0.634513 |
| | | $d_4$ variable | | | |
| | $r_5$ 60.00 | | | | |
| $G_3$ | | $d_5$ 4.0 | $N_3$ 1.62041 | $\nu_3$ 60.29 | |
| $Lo_2$ | $r_6$ −10.00 | | | | |
| $G_4$ | | $d_6$ 1.0 | $N_4$ 1.6727 | $\nu_4$ 32.22 | |
| | $r_7$ −13.82 | | | | |
| | | $d_7$ variable | | | |
| | $r_8$ 14.3 | | | | −0.6 |
| Lc $G_5$ | | $d_8$ 3.4 | $N_5$ 1.4914 | $\nu_5$ 57.82 | |
| | $r_9$ −75.00 | | | | |
| | | $d_9$ 25.5 | | | |
| | $r_{10}$ −94.616 | | | | |
| $G_6$ | | $d_{10}$ 1.3 | $N_6$ 1.584 | $\nu_6$ 31.00 | |
| | $r_{11}$ 9.209 | | | | |
| Le | | $d_{11}$ 0.5 | | | |
| | $r_{12}$ 8.00 | | | | −0.15 |
| $G_7$ | | $d_{12}$ 3.7 | $N_7$ 1.4914 | $\nu_7$ 57.82 | |
| | $r_{13}$ −13.181 | | | | |
| | | $d_{13}$ 13.0 | | | |
| | $r_{14}$ pupil | | | | |

TABLE 9-continued

Embodiment 9

|  | $d_4$ | $d_7$ | diopter in center | finder magnification |
|---|---|---|---|---|
| Standard | 22.421 | 25.0 | −1.000 | 0.453 |
| Middle | 5.98 | 35.5 | −0.996 | 0.891 |
| Tele | 0.5 | 45.66 | −0.999 | 1.316 |
| frame |  |  | −1.024 |  |

$1/f_1 = -0.0368$  $1/f_2 = 0.0525$
$f_e/(f_1 \cdot f_2) = -0.0580$  $r_{1B}/r_{1F} = 0.7760$
$r_{2B}/r_{2F} = 0.2303$  $f_{oT}/f_e = 1.4986$
$\nu eP = 57.82$  $\nu eN = 31.00$
$r_{eP}/r_{eN} = 0.8687$  $r_{eB}/f_e = -0.4390$
$f_{eN}/f_e = -0.4764$

TABLE 10

Embodiment 10

|  | Radius of Curvature | Axial Distance | Refractive Index (Nd) | Abbe Number | Aspheric Coefficient (ε) |
|---|---|---|---|---|---|
| G$_1$ | r$_1$ 41.346 | d$_1$ 1.2 | N$_1$ 1.584 | ν$_1$ 31.00 |  |
|  | r$_2$ 27.047 |  |  |  | 0.750491 |
| Lo$_1$ |  | d$_2$ 2.0 |  |  |  |
|  | r$_3$ −79.748 |  |  |  |  |
| G$_2$ |  | d$_3$ 1.2 | N$_2$ 1.584 | ν$_2$ 31.00 |  |
|  | r$_4$ 26.443 |  |  |  | 0.590166 |
|  |  | d$_4$ variable |  |  |  |
|  | r$_5$ −212.904 |  |  |  |  |
| G$_3$ |  | d$_5$ 4.0 | N$_3$ 1.4914 | ν$_3$ 57.82 |  |
|  | r$_6$ −17.328 |  |  |  |  |
| Lo$_2$ |  | d$_6$ 1.0 |  |  |  |
|  | r$_7$ 67.021 |  |  |  |  |
| G$_4$ |  | d$_7$ 2.5 | N$_4$ 1.4914 | ν$_4$ 57.82 |  |
|  | r$_8$ −28.8 |  |  |  |  |
|  |  | d$_8$ variable |  |  |  |
|  | r$_9$ 14.3 |  |  |  | −1.3 |
| Lc G$_5$ |  | d$_9$ 3.4 | N$_5$ 1.4914 | ν$_5$ 57.82 |  |
|  | r$_{10}$ −75.00 |  |  |  |  |
|  |  | d$_{10}$ 20.5 |  |  |  |
|  | r$_{11}$ −80.00 |  |  |  |  |
| G$_6$ |  | d$_{11}$ 1.1 | N$_6$ 1.584 | ν$_6$ 31.00 |  |
|  | r$_{12}$ 13.452 |  |  |  |  |
| Le |  | d$_{12}$ 0.5 |  |  |  |
|  | r$_{13}$ 8.00 |  |  |  | −0.71 |
| G$_7$ |  | d$_{13}$ 4.0 | N$_7$ 1.4914 | ν$_7$ 57.82 |  |
|  | r$_{14}$ −16.00 |  |  |  |  |
|  |  | d$_{14}$ 13.0 |  |  |  |
|  | r$_{15}$ pupil |  |  |  |  |

|  | $d_4$ | $d_8$ | diopter in center | finder magnification |
|---|---|---|---|---|
| Standard | 23.4 | 26.49 | −0.963 | 0.599 |
| Middle | 6.225 | 38.53 | −0.961 | 1.198 |
| Tele | 0.5 | 50.57 | −0.959 | 1.796 |
| frame |  |  | −1.000 |  |

$1/f_1 = -0.0370$  $1/f_2 = 0.0492$
$f_e/(f_1 \cdot f_2) = -0.0423$  $r_{1B}/r_{1F} = 0.6395$
$r_{2B}/r_{2F} = 0.1353$  $f_{oT}/f_e = 2.0639$
$\nu eP = 57.82$  $\nu eN = 31.00$
$r_{eP}/r_{eN} = 0.5947$  $r_{eB}/f_e = -0.6880$
$f_{eN}/f_e = -0.8442$

TABLE 11

| axial distance | Wide | | Middle | | Tele | |
|---|---|---|---|---|---|---|
|  | diop. in ctr. | finder mag. | diop. in ctr. | finder mag. | diop. in ctr. | finder mag. |
| 0.1 | −4.301 | 0.501 | −4.301 | 1.003 | −4.301 | 1.504 |
| 0.2 | −3.461 | 0.503 | −3.461 | 1.006 | −3.461 | 1.509 |
| 0.3 | −2.616 | 0.505 | −2.616 | 1.009 | −2.616 | 1.514 |
| 0.4 | −1.765 | 0.506 | −1.765 | 1.013 | −1.765 | 1.519 |
| 0.5 | −0.909 | 0.508 | −0.909 | 1.016 | −0.909 | 1.524 |
| 0.6 | −0.047 | 0.510 | −0.047 | 1.019 | −0.047 | 1.529 |
| 0.7 | 0.821 | 0.511 | 0.821 | 1.023 | 0.821 | 1.534 |
| 0.8 | 1.695 | 0.513 | 1.695 | 1.026 | 1.695 | 1.540 |
| 0.9 | 2.575 | 0.515 | 2.575 | 1.030 | 2.575 | 1.545 |

What is claimed is:

1. Variable magnification viewfinder optical system, comprising from the object side:
   an objective lens group of a positive refractive power, including a first lens unit of a negative refractive power and a second lens unit of a positive refractive power, said first and second lens units being shiftable along the optical axis of the optical system for changing the magnification of the optical system;

a condenser lens group of a positive refractive power; and an eyepiece lens group of a positive refractive power;

wherein the objective lens group forms a real image of an object and the real image can be observed through the eyepiece lens group;

and wherein the optical system fulfills the following conditions;

$$-0.09/\text{mm} < 1/f_1 < -0.03/\text{mm}$$

$$0.04/\text{mm} < 1/f_2 < 0.11/\text{mm}$$

$$-0.1/\text{mm} < f_e/(f_1 \cdot f_2) < -0.035/\text{mm}$$

wherein:
$f_1$ represents the focal length of the first lens unit of the objective lens group in millimeters;
$f_2$ represents the focal length of the second lens unit of the objective lens group in millimeters; and
$f_e$ represents the focal length of the eyepiece lens group in millimeters.

2. Variable magnification viewfinder optical system as claimed in claim 1, wherein the optical system further fulfills the following conditions;

$$|r_{1B}/r_{1F}| < 6$$

$$|r_{2B}/r_{2F}| < 2$$

$$0.9 < f_{oT}/f_e < 3$$

wherein:
$r_{1B}$ represents a radius of curvature of a lens surface located at the object side in the first lens unit of the objective lens group;
$r_{1F}$ represents a radius of curvature of a lens surface located at the eye side in the first lens unit of the objective lens group;
$r_{2B}$ represents a radius of curvature of a lens surface located at the object side in the second lens unit of the objective lens group;
$r_{2F}$ represents a radius of curvature of a lens surface located at the eye side in the second lens unit of the objective lens group; and
$f_{oT}$ represents the focal length of the objective lens group at the largest magnification condition.

3. Variable magnification viewfinder optical system as claimed in claim 1, wherein the eyepiece lens group consists of one positive lens element and one negative lens element, and wherein the optical system further fulfills the following conditions;

$$\nu_{eP} > 45$$

$$\nu_{eN} < 40$$

$$0.5 < r_{eP}/r_{eN} < 0.95$$

$$-0.8 < r_{eB}/f_e < -0.35$$

$$-0.9 < f_{eN}/f_e < -0.4$$

wherein:

$\nu_{eP}$ represents Abbe number of the positive lens element included in the eyepiece lens group;
$\nu_{eN}$ represents Abbe number of the negative lens element included in the eyepiece lens group;
$r_{eP}$ represents a radius of curvature of a lens surface of the positive lens element faced to the negative lens element;
$r_{eN}$ represents a radius of curvature of a lens surface of the negative lens element faced to the positive lens element;
$r_{eB}$ represents a radius of curvature of a lens surface located at the eye side in the eyepiece lens group; and
$f_{eN}$ represents the focal length of the negative lens element of the eyepiece lens group.

4. Variable magnification viewfinder optical system as claimed in claim 3, wherein one of the positive and negative lens elements in the eyepiece lens group is shiftable for adjusting the diopter of the optical system.

5. Variable magnification viewfinder optical system as claimed in claim 1, wherein the objective lens group includes at least one aspheric surface.

6. Variable magnification viewfinder optical system as claimed in claim 1, wherein the condenser lens group includes at least one aspheric surface whose radius of curvature decreases in proportional to the height measured from the optical axis in a direction perpendicular to the optical axis.

7. Variable magnification viewfinder optical system as claimed in claim 1, wherein the eyepiece lens group includes at least one aspheric surface whose radius of curvature decreases in proportional to the height measured from the optical axis in a direction perpendicular to the optical axis.

8. Variable magnification viewfinder optical system, comprising from the object side:

objective lens group of a positive refractive power, including a first lens unit of a negative refractive power and a second lens unit of a positive refractive power, said first and second lens units being shiftable along the optical axis of the optical system for changing the magnification of the optical system;

condenser lens group of a positive refractive power; and eyepiece lens group of a positive refractive power;

wherein the objective lens group forms a real image of an object and the real image can be observed through the eyepiece lens group;

and wherein the optical system fulfills the following condition;

$$0.9 < f_{oT}/f_e < 3$$

wherein:
$f_{oT}$ represents a focal length of the objective lens group at the largest magnification condition; and
$f_e$ represents a focal length of the eyepiece lens group.

9. Variable magnification viewfinder optical system, comprising from the object side:

objective lens group of a positive refractive power, including a first lens unit of a negative refractive power and a second lens unit of a positive refractive power, said first and second lens units being shiftable along the optical axis of the optical system for changing the magnification of the optical system;

condenser lens group of a positive refractive power; and eyepiece lens group of a positive refractive power, consisting of one positive lens element and one negative lens element;

wherein the objective lens group forms a real image of an object and the real image can be observed through the eyepiece lens group.

10. Variable magnification viewfinder optical system as claimed in claim 9, wherein the optical system further fulfills the following conditions;

$$\nu_{eP} > 45$$
$$\nu_{eN} < 40$$

wherein;

$\nu_{eP}$ represents Abbe number of the positive lens element included in the eyepiece lens group; and $\nu_{eN}$ represents Abbe number of the neative lens element included in the eyepiece lens group.

11. Variable magnification viewfinder optical system as claimed in claim 10, wherein the eyepiece lens group consists of, from the object side, one positive lens element and one negative lens element.

12. Variable magnification viewfinder optical system as claimed in claim 11, wherein the optical system further fulfills the following conditions;

$$0.5 < r_{eP}/r_{eN} < 0.95$$

$$-0.8 < r_{eB}/f_e < -0.35$$

$$-0.9 < f_{eN}/f_e < -0.4$$

wherein:

$r_{eP}$ represents a radius of curvature of a lens surface of the positive lens element faced to the negative lens element;

$r_{eN}$ represents a radius of curvature of a lens surface of the negative lens element faced to the positive lens element;

$r_{eB}$ represents a radius of curvature of a lens surface located at the eye side in the eyepiece lens group;

$f_{eN}$ represents a focal length of the negative lens element of the eyepiece lens group; and $f_e$ represents a focal length of the eyepiece lens group.

13. Variable magnification viewfinder optical system as claimed in claim 9, wherein one of the positive and negative lens elements in the eyepiece lens group is shiftable for adjusting the diopter of the optical system.

14. Variable magnification viewfinder optical system as claimed in claim 13, wherein the positive lens element of the eyepiece lens group is shiftable for adjusting the diopter of the optical system.

15. Variable magnification viewfinder optical system as claimed in claim 13, wherein the eyepiece lens group includes at least one aspheric surface whose radius of curvature decreases in proportional to the height measured from the optical axis in a direction perpendicular to the optical axis.

16. Variable magnification viewfinder optical system, comprising from the object side:

objective lens group of a positive refractive power, including a first lens unit of a negative refractive power and a second lens unit of a positive refractive power, said first and second lens units being shiftable along the optical axis of the optical system for changing the magnification of the optical system;

image reverse optical system including a condenser lens group of a positive refractive power; and eyepiece lens group of a positive refractive power, consisting of one positive lens element and one negative lens element;

wherein the objective lens group forms a real image of an object and the real image can be observed through the eyepiece lens group.

17. Variable magnification viewfinder optical system as claimed in claim 16, wherein the objective lens group forms the real image out of the condenser lens group.

18. Variable magnification viewfinder optical system as claimed in claim 16, wherein the image reverse optical system is a parro prism.

* * * * *